(12) United States Patent
Vogel

(10) Patent No.: US 6,785,292 B1
(45) Date of Patent: Aug. 31, 2004

(54) METHOD FOR DETECTING RADIO FREQUENCY IMPAIRMENTS IN A DATA-OVER-CABLE SYSTEM

(75) Inventor: Mark O. Vogel, Hampshire, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/322,513

(22) Filed: May 28, 1999

(51) Int. Cl.[7] ........................ G01R 31/08; H04L 12/28; H04N 7/173

(52) U.S. Cl. ................... 370/433; 370/252; 370/395.4; 725/111; 725/103

(58) Field of Search ............................... 370/493, 494, 370/495, 433, 431, 432, 458, 459, 247, 460, 461, 468, 347; 455/69, 552, 553; 725/5.1, 103, 125, 124, 111, 107; 375/222; 324/620; 709/226, 224, 225, 227, 228

(56) References Cited

U.S. PATENT DOCUMENTS

| | | | |
|---|---|---|---|
| 4,644,533 A | 2/1987 | Braff et al. ................... 370/94 |
| 4,881,263 A | 11/1989 | Herbison et al. | |
| 4,996,685 A | 2/1991 | Farese et al. .............. 370/58.1 |
| 5,014,234 A | 5/1991 | Edwards, Jr. | |
| 5,138,712 A | 8/1992 | Corbin | |
| 5,301,273 A | 4/1994 | Konishi ..................... 395/200 |
| 5,347,304 A | 9/1994 | Moura | |
| 5,430,727 A | 7/1995 | Callon ..................... 370/85.13 |
| 5,442,749 A | 8/1995 | Northcutt et al. | |
| 5,488,412 A | 1/1996 | Majeti | |

(List continued on next page.)

FOREIGN PATENT DOCUMENTS

WO   WO 00/67385   11/2000

OTHER PUBLICATIONS

"Baseline Privacy Interface Specification (Interim) SP–B-PI–I01–970922", MCNS Holdings, L.P., 1997, pp. ii to 65.
"Security System Specification (Interim Specification) SPISSI–I01–970506", MCNS Holdings, L.P., 1997, pp. ii to 103.
"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.
"Operations Support System Interface Specification Baseline Privacy Interface MIB (Interim Specification) SP–OS-SI–BPI–I01–980331", MCNS Holdings, L.P., 1997 and 1998, pp. ii to 33.
"Cable Modem Termination System–Network Side Interface Specification (Interim Specification) SP–CMTS–N-SII01–960702", MCNS Holdings, L.P., 1996, pp. ii to 13.
"Removable Security Module Interface Specification (Interim Specification) SP–RSMI–I01–980204", MCNS Holdings, L.P., Cable Television Laboratories, Inc., 1997, pp. ii to 47.

(List continued on next page.)

Primary Examiner—Hanh Nguyen
(74) Attorney, Agent, or Firm—McDonnell Boehnen Hulbert & Berghoff

(57) ABSTRACT

A method and system for determining a source radio frequency impairment in a data-over-cable system. The method includes ascertaining reference signal-to-noise ratios and comparing them to signal-to-noise ratios that are measured when the system is in operation. The signal-to-noise ratios are measured under different selections of which cable modems transmit. The method determines whether there are degradations on one or more upstream channel and correlates the degradations to identify the source of the impairment. The identification of impairments helps ensure that the source of impairment may be removed from the data-over-cable system to provide better overall performance.

11 Claims, 17 Drawing Sheets

U.S. PATENT DOCUMENTS

| | | | |
|---|---|---|---|
| 5,489,897 A | 2/1996 | Inoue | |
| 5,528,595 A | 6/1996 | Walsh et al. | 370/85.13 |
| 5,583,931 A | 12/1996 | Schneider | |
| 5,586,121 A | 12/1996 | Moura | |
| 5,598,410 A | 1/1997 | Stone | |
| 5,600,717 A | 2/1997 | Schneider | |
| 5,606,606 A | 2/1997 | Schneider | |
| 5,608,446 A | 3/1997 | Carr | |
| 5,610,910 A | 3/1997 | Focsaneanu et al. | 370/351 |
| 5,623,542 A | 4/1997 | Schneider | |
| 5,623,601 A | 4/1997 | Vu | |
| 5,636,211 A | 6/1997 | Newlin | |
| 5,675,732 A | 10/1997 | Majeti | |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | |
| 5,724,510 A | 3/1998 | Arndt et al. | 395/200.5 |
| 5,761,602 A | 6/1998 | Wagner et al. | |
| 5,778,181 A | 7/1998 | Hidary et al. | |
| 5,784,597 A | 7/1998 | Chiu et al. | 395/552 |
| 5,790,198 A | 8/1998 | Roop et al. | |
| 5,790,548 A | 8/1998 | Sistanizadeh et al. | |
| 5,790,677 A | 8/1998 | Fox et al. | |
| 5,790,770 A | 8/1998 | McClure et al. | 395/200.61 |
| 5,790,806 A | 8/1998 | Koperda | |
| 5,793,747 A | 8/1998 | Kline | 370/230 |
| 5,799,086 A | 8/1998 | Sudia | |
| 5,805,804 A | 9/1998 | Laursen et al. | |
| 5,809,252 A | 9/1998 | Beighe et al. | 395/200.57 |
| 5,812,819 A | 9/1998 | Rodwin et al. | |
| 5,815,664 A | 9/1998 | Asano | 395/200.57 |
| 5,818,845 A | 10/1998 | Moura et al. | |
| 5,819,028 A | 10/1998 | Manghirmalani et al. | |
| 5,819,042 A | 10/1998 | Hansen | |
| 5,828,655 A | 10/1998 | Moura et al. | |
| 5,828,666 A | 10/1998 | Focsaneanu et al. | 370/389 |
| 5,835,720 A | 11/1998 | Nelson et al. | |
| 5,835,727 A | 11/1998 | Wong et al. | |
| 5,841,777 A | 11/1998 | Cohen | |
| 5,848,233 A | 12/1998 | Radia et al. | 395/187.01 |
| 5,852,721 A | 12/1998 | Dillon et al. | |
| 5,854,901 A | 12/1998 | Cole et al. | |
| 5,859,852 A | 1/1999 | Moura et al. | |
| 5,864,679 A | 1/1999 | Kanai et al. | |
| 5,870,134 A | 2/1999 | Laubach et al. | |
| 5,872,523 A | 2/1999 | Dellaverson et al. | |
| 5,884,024 A | 3/1999 | Lim et al. | |
| 5,892,754 A | 4/1999 | Kompella et al. | 370/236 |
| 5,894,479 A | 4/1999 | Mohammed | 370/401 |
| 5,903,558 A | 5/1999 | Jones et al. | |
| 5,909,549 A | 6/1999 | Compliment et al. | 709/223 |
| 5,913,037 A | 6/1999 | Spofford et al. | |
| 5,913,041 A * | 6/1999 | Ramanathan et al. | 709/233 |
| 5,915,119 A | 6/1999 | Cone | 395/750.02 |
| 5,922,049 A | 7/1999 | Radia et al. | |
| 5,922,051 A | 7/1999 | Sidey | |
| 5,923,659 A | 7/1999 | Curry et al. | |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | |
| 5,958,007 A | 9/1999 | Lee et al. | |
| 5,960,177 A | 9/1999 | Tanno | 395/200.59 |
| 5,974,453 A | 10/1999 | Andersen et al. | |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | |
| 5,999,536 A | 12/1999 | Kawafuji et al. | 370/401 |
| 6,003,077 A | 12/1999 | Bawden et al. | |
| 6,005,851 A | 12/1999 | Craddock et al. | 370/329 |
| 6,006,264 A | 12/1999 | Colby et al. | |
| 6,009,103 A | 12/1999 | Woundy | |
| 6,012,088 A | 1/2000 | Li et al. | |
| 6,013,107 A | 1/2000 | Blackshear et al. | |
| 6,014,545 A | 1/2000 | Wu et al. | 455/3.1 |
| 6,018,767 A | 1/2000 | Fijolek et al. | |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | |
| 6,049,825 A | 4/2000 | Yamamoto | 709/221 |
| 6,049,826 A | 4/2000 | Beser | |
| 6,052,724 A | 4/2000 | Willie et al. | |
| 6,058,421 A | 5/2000 | Fijolek et al. | |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | |
| 6,073,178 A | 6/2000 | Wong et al. | 709/229 |
| 6,075,787 A | 6/2000 | Bobeck et al. | |
| 6,075,972 A * | 6/2000 | Laubach et al. | 455/5.1 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,151,559 A * | 11/2000 | Williams | 702/58 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriquez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/401 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,344,749 B1 * | 2/2002 | Williams | 324/620 |
| 6,351,773 B1 | 2/2002 | Fijolek et al. | 709/228 |
| 6,370,147 B1 | 4/2002 | Beser | 370/401 |
| 6,385,773 B1 * | 5/2002 | Schwartzman et al. | 725/124 |
| 6,393,478 B1 | 5/2002 | Bahlmann | 709/224 |
| 6,418,137 B1 * | 7/2002 | Bontu et al. | 370/347 |
| 6,442,158 B1 | 8/2002 | Beser | 370/352 |
| 6,449,291 B1 | 9/2002 | Burns et al. | 370/516 |

| | | |
|---|---|---|
| 6,453,472 B1 | 9/2002 | Leano et al. ................ 725/111 |
| 6,490,727 B1 | 12/2002 | Nazarathy et al. .......... 725/129 |
| 6,510,162 B1 | 1/2003 | Fijolek et al. .............. 370/432 |
| 6,594,305 B1 * | 7/2003 | Roeck et al. ............... 375/222 |
| 2002/0122050 A1 | 9/2002 | Sandberg ................... 345/705 |
| 2002/0136165 A1 | 9/2002 | Ady et al. .................. 370/241 |
| 2003/0028891 A1 | 2/2003 | Hardt et al. ................ 725/107 |

OTHER PUBLICATIONS

"Operations Support System Interface Specification (Interim) SP–OSSIIO1–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Internet Engineering Task Force", Request for Comments 2131, Dynamic Host Confiquration Protocol (DHCP), Mar. 1997, pp. 1 to 42.

"Internet Engineering Task Force", IPCDN Working Group, IPCDN Telephony Return MIB, Mar. 1998, pp. 1 to 27.

Kyees et al., IEEE Electronic Library, Citation and Abstract, IEEE Communications Magazine, vol. 33, Issue 4, Apr. 1995, "ADSL: A New Twisted–Pair Access To The Information Highway," pp. 52–60.

Yin–Hwa Huang et al., IEEE Electronic Library, Citation and Abstract, Acoustics, Speech, and Signal Processing, 1995.ICASSP–95., 1995 International Conference, vol. 4, May 9–12, 1995, "Design Of An MPEG–Based Set–Top Box For Video On Demand Services," pp. 2655–2658.

"Radio Frequency Interface Specification (Interim Specification) SP–RFI–I04–980724", MCNS Holdings, L.P., 1997, pp. ii to 196.

"Radio Frequency Interface Specification (Interim Specification) SP–RFI–I05–991105", MCNS Holdings, L.P., 1999, pp. ii to 202.

"Radio Frequency Interface Specification (Interim Specification) SP–RFIv1.1–I06–001215", MCNS Holdings, L.P., 2000, pp. ii to 432.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1–37.

Postel, J., *Internet Protocol, DARPA Internet Program Protocol Specification*, RFC 792, Sep. 1981, pp. 1–14.

Postel, J., *User Datagram Protocol*, RFC 768, Aug. 28, 1980, pp. 1–3.

RFC 793, *Transmission Control Protocol, DARPA Internet Program Protocol Specification*, Sep. 1981, pp. 1–68.

Case, J. et al., *A Simple Network Management Protocol (SNMP)*, RFC 1157, May 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–37.

"Radio Frequency Interface Specification (Interim Specification) SP–RFIv1.1–I03–991105", MCNS Holdings, L.P., 1999, pp. ii to 366.

* cited by examiner

FIG. 5

MAP INFORMATION ELEMENTS ⟵ 100

| | SID | IUC | OFFSET |
|---|---|---|---|
| FIRST INTERVAL | SID<br>76 | IUC<br>102 | OFFSET<br>104 |
| SECOND INTERVAL | SID | IUC | OFFSET |
| | | | |
| LAST INTERVAL | SID | IUC | OFFSET |

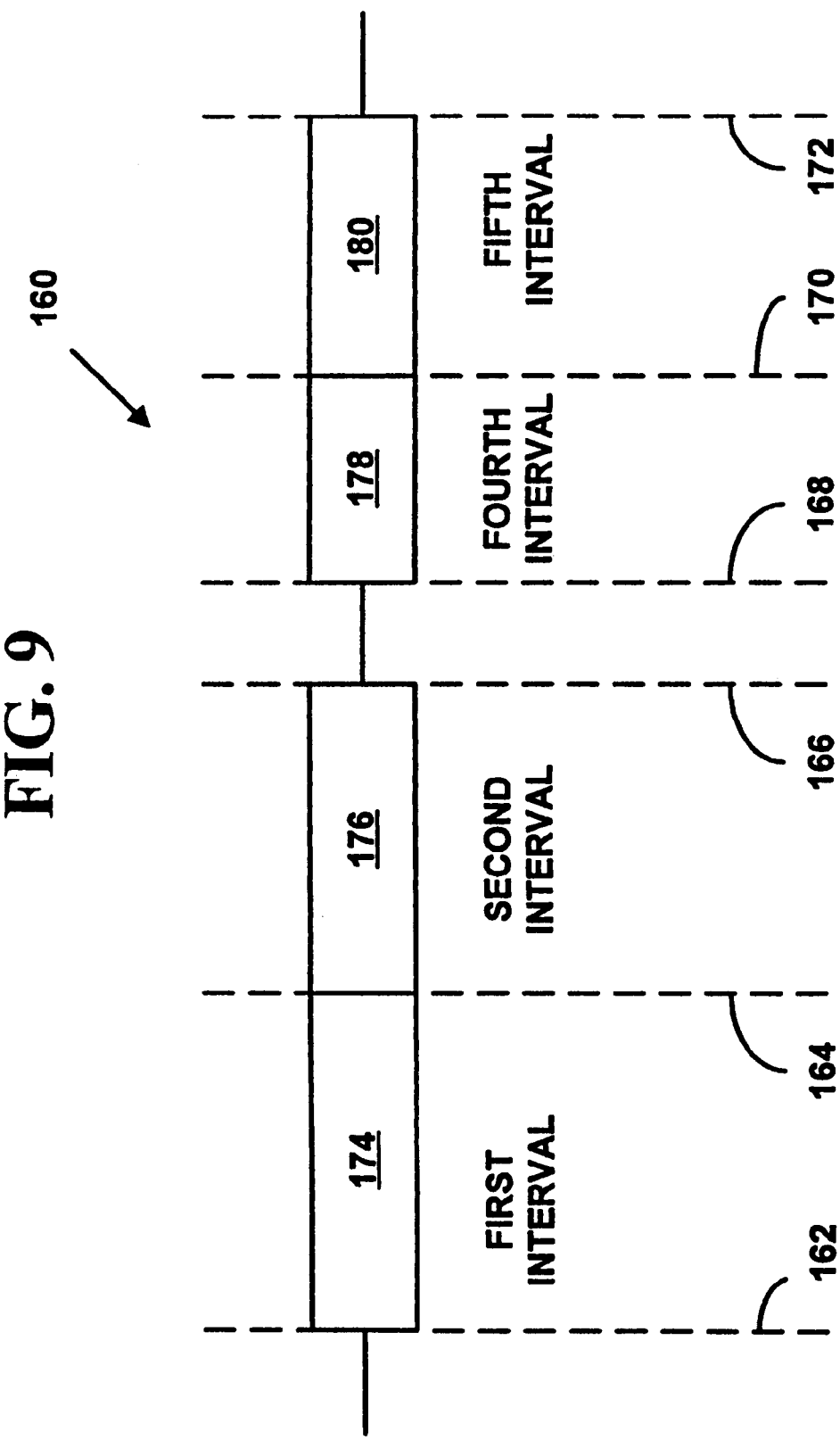

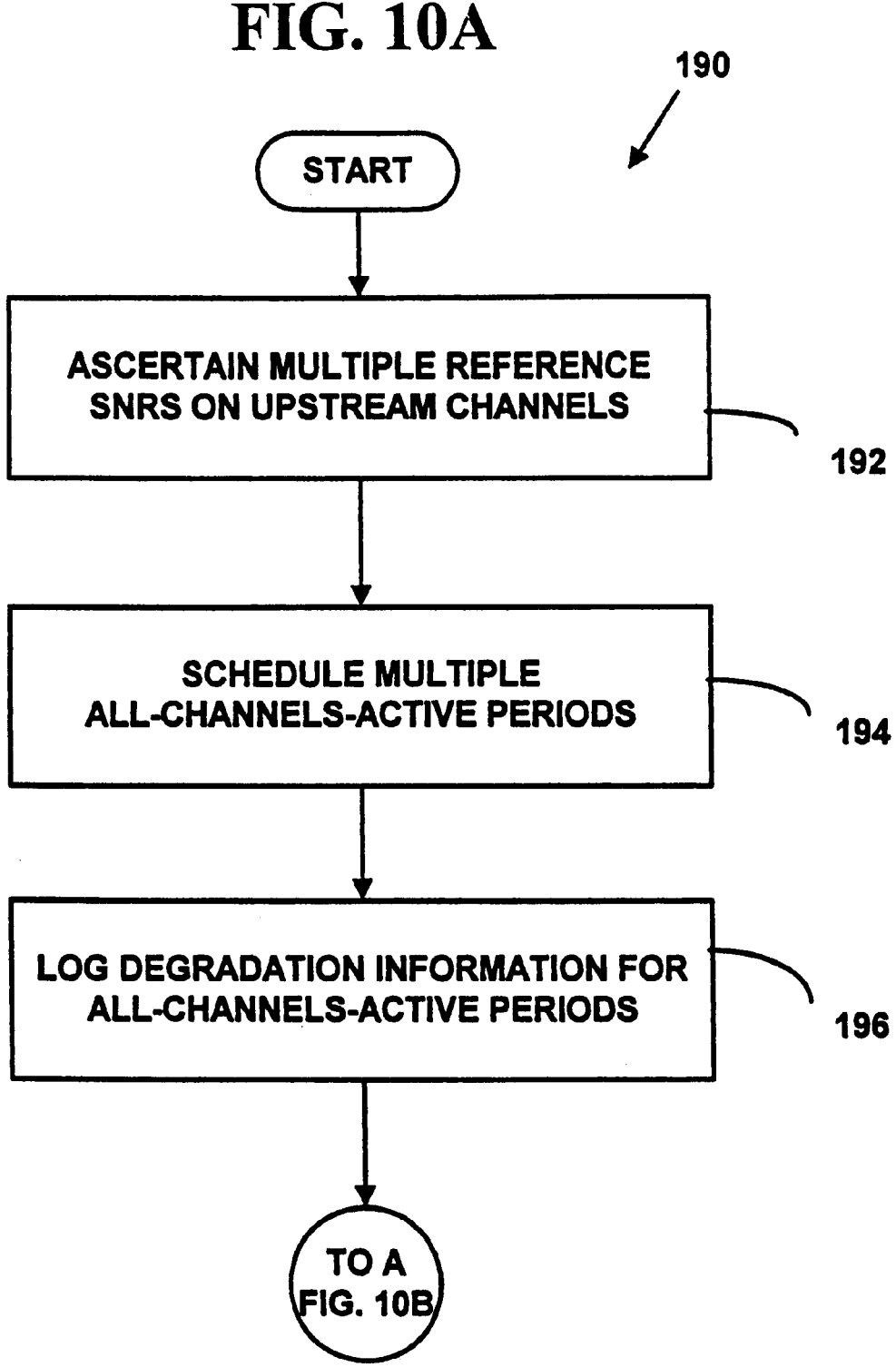

METHOD FOR DETECTING RADIO FREQUENCY IMPAIRMENTS IN A DATA-OVER-CABLE SYSTEM

FIELD OF INVENTION

The present invention relates to communications in computer networks. More specifically, it relates to a method for dynamically optimizing performance in a data-over-cable system.

BACKGROUND OF THE INVENTION

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television service to a large number of subscribers over a large geographical area. The cable television networks typically are interconnected by cables such as coaxial cables or a Hybrid Fiber/Coaxial ("HFC") cable system. The system can also provide data services having data rates of about 10 Mega-bits-per-second ("Mbps") to 30+ Mbps per channel.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a public switched telephone network at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs") and other computer networks via cable television networks. These cable modems currently support a data connection to the Internet and other computer networks via a cable television network with a data rate of up to 30+ Mbps which is a much larger data rate than can be supported by a modem used over a serial telephone line.

Background information related to cable modem systems in general is described in the Data-Over-Cable Service Interface Specifications ("DOCSIS")—Radio Frequency Interface Specifications, Interim Draft, dated Jul. 24, 1998, issued by Cable Television Laboratories, Inc. DOCSIS may be found on the World Wide Web. This document, known to persons working in the art, is incorporated by reference herein in its entirety.

The basic overall architecture of a data-over-cable system is shown in FIG. 1. The system of FIG. 1 provides a mechanism by which a computer 10 connected to a backbone network 12 (either directly or indirectly by intermediate networks) may communicate with another computer 14 via a cable television infrastructure indicated generally by reference numeral 16. The cable television infrastructure 16 includes a distribution hub or "head-end" 18 that is connected to the backbone network 12 via a wide area network ("WAN") and a switch or router 20. A cable system head-end 18 is a central location in the cable television network that is responsible for sending cable signals in the downstream direction. The head-end 18 modulates 20 digital data into analog form and supplies analog signals to a fiber network 22, which is connected to a plurality of optical/electronic ("O/E") nodes 24. The O/E nodes 24 convert optical signals in the fiber network 22 to electrical signals for transmission over a coax cable network 26 to a cable modem 28 at the customer's location. The cable modem 28 demodulates the analog signals and extracts the digital data and supplies the data to the customer premise equipment ("CPE") 14, which, in a typical situation, is a general purpose computer in a home environment.

The head-end 18 includes a cable modem termination system ("CMTS") 30. This device provides a network side interface to a wide area network, indicated at 32, and a radio frequency ("RF") interface between the cable modem termination system and the cable network in both the downstream and upstream directions, indicated at 34 and 36. The term "downstream", as used in the present document, refers to transmission in the direction from the head-end 18 or cable modem termination system 30 to the cable modem 28 at the customer premises. The term "upstream" refers to transmission in the direction from the cable modem 28 at the customer premises to the cable modem termination system 30.

For transmission in the downstream direction, the cable modem termination system 30 supplies data from the computer 10 to a modulation circuit ("MOD") and to a combiner 38, where the data is combined with video signals for the cable television system. The combined signals are sent to a transmission module 40 where they are imparted onto the fiber network. In the receiving direction, data from the CPE 14 is received from the fiber network at a receive module 42, sent to a splitter and filter bank 44 and sent to a demodulation circuit ("DEMOD") in the cable modem termination system 30. The data is processed by a network termination unit 46, sent to the switch or router 20 and routed onto the WAN for transmission to the remote computer 10.

Many cable television networks provide only uni-directional cable systems, supporting only a "downstream" cable data path. A return data path via a telephone network (i.e., a "telephony return"), such as a public switched telephone network provided by AT&T, GTE, Sprint, MCI and others, is typically used for an "upstream" data path. A cable television system with an upstream connection to a telephony network is called a "data-over-cable system with telephony return." Such a return system is indicated at 48 where the cable modem 28 is also shown connected to the public switched telephone network ("PSTN").

An exemplary data-over-cable system with telephony return includes customer premises equipment (e.g., a customer computer), a cable modem, a cable modem termination system, a cable television network, a public switched telephone network, a telephony remote access concentrator ("TRAC") 49 and a backbone data network 12 (e.g., the Internet). The cable modem termination system 30 and the telephony remote access concentrator 49 together are called a "telephony return termination system."

In a two-way cable system without telephony return, also termed a bi-directional cable system, the customer premises equipment 14 sends data packets to the cable modem 28, which sends the data packets upstream via the cable television network 22 and 26 to the cable modem termination system 30. Such a system is shown in FIG. 1. The cable modem termination system 30 sends the data packets to appropriate hosts on the data network 12. The cable modem termination system 30 sends the response data packets back to the appropriate cable modem 28.

In a bi-directional cable system, the cable modem termination system 30 can continuously collect information about the level of impairments on the upstream RF path of a cable plant, i.e., the portion of the network between the demodulation circuit in the cable modem termination system 30 and the cable modems 28. Further, a single O/E node 24 may serve multiple channels and cable modems. Measurements such as the noise floor level, and signal-to-noise ratio per cable modem transmission, can be made for the coax and fiber networks, along with the tracking of which cable modems are active during a given measurement interval.

The data-carrying performance of the upstream channels may vary with the conditions for radio frequency propagation on the cable network. Defective radio frequency interfaces may introduce sufficient noise into an upstream channel that the noise significantly impairs the ability of the channel to transport data packets from the cable modems to the cable modem termination system without error. Extraneous sources of radio frequency, such as citizen band or amateur radio broadcasts, may also infiltrate the upstream channels, interfere with the radio frequency carriers for the upstream channels, increase the packet error rate, reduce the data throughput, and generally impair the performance of the data-over-cable network.

Previous methods do not determine the source of the RF impairment. The source may not be readily apparent to the user (e.g., technician or cable system operator) if the degradation in the data transmission is intermittent or across multiple upstream channels. The impairment may even occur when the faulty cable modem is not transmitting. Additionally, the cause of the impairment may be more than just a noisy cable modem or an interfering external RF source. Other causes for degradation may include cross-talk between cable modems on upstream cable paths, physical defects in upstream cable paths, bugs in one or more cable modems' software for time division multiplexing, or flaws in the O/E nodes in the data-over-cable system. However, by monitoring the condition of the network when different cable modems are transmitting it may be possible to detect, isolate, and ultimately remove the source of the degradation. In order for the network condition data to be useful, there must be a method of correlating impairments with upstream channels, cable modems, and impairment levels in order for the user to determine the source of the particular impairment.

It is therefore desirable to improve the monitoring of transmissions on the upstream network to determine the source of problems in the data-over-cable network. Determining the source of problems may improve the performance of the data-over-cable network.

SUMMARY OF THE INVENTION

In accordance with preferred embodiments of the present invention, some of the problems associated with detecting the source of problems in a data-over-cable system are overcome. Methods and systems for determining a source of radio frequency impairment in a data-over-cable system are provided. One aspect of the invention includes a method for determining a source of radio frequency impairment on an upstream path where the upstream path comprises an upstream channel. The method includes ascertaining a reference signal-to-noise ratio. A plurality of signal-to-noise ratios is measured during a plurality of active periods. One cable modem transmits during each active period. Each measured signal-to-noise ratio is compared to the reference signal-to-noise ratio to obtain a degradation value for the active period. It is determined whether the degradation value is greater than a threshold, and if so, parameters associated with the cable modem that is active during the active period are logged. The logged parameters and the source of radio frequency impairment is identified.

Another aspect of the invention includes a method for determining a source of radio frequency impairment on an upstream path where the upstream path comprises a plurality of upstream channels. The method includes ascertaining a plurality of reference signal-to-noise ratios. Each reference signal-to-noise ratio corresponds to an upstream channel. A plurality of all-channels-active periods is scheduled. All upstream channels are simultaneously active during each all-channels-active period and only one cable modem is transmitting on each of the active upstream channels. Degradation information for the all-channels-active periods is logged. A plurality of single-channel-active periods is scheduled. One upstream channel is active during each single-channel-active period and only one cable modem is transmitting on the active upstream channel. Degradation information for the single-channel-active periods is logged. The logged degradation information is correlated and the source of radio frequency impairment is identified.

However, the present invention is not limited to cable modems, cable modem termination systems, all-channels-active periods, single-channel-active periods, and other network devices and configurations of periods of upstream channel activity could be used. The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 5 is a block diagram illustrating the structure of MAP Information Elements;

FIG. 9 is a timeline diagram illustrating an upstream usage interval;

DETAILED DESCRIPTION OF PREFERRED EMBODIMENTS

In a bi-directional data-over-cable system, a cable modem ("CM") 28 will transmit data packets to the cable modem termination system ("CMTS) 30 over one or more upstream channels on the cable television network 22 and 26. A data packet may carry, as its payload, information that is sent from the customer premise equipment ("CPE") 14 and destined for the CMTS 30. The CM 28 adds overhead to the data packet to maintain the integrity of the payload. Examples of overhead include redundant bits for error correction and preambles. The data packet and overhead are transmitted from and received by the CM 28 in the form of digitally modulated radio frequency carriers on the analog cable network.

Cable Modem Protocol Stack

Figure 1:
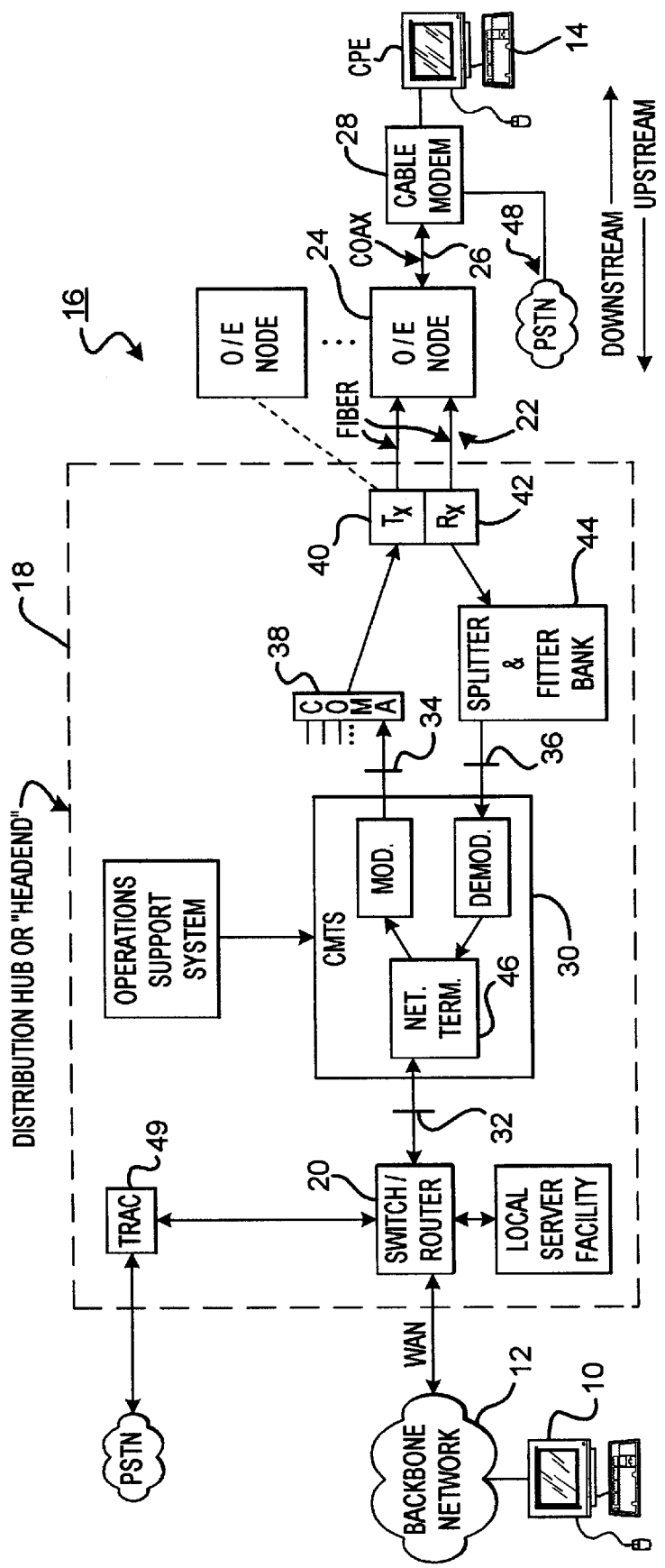
FIG. 1 is a block diagram illustrating a cable modem system.
Figure 2:
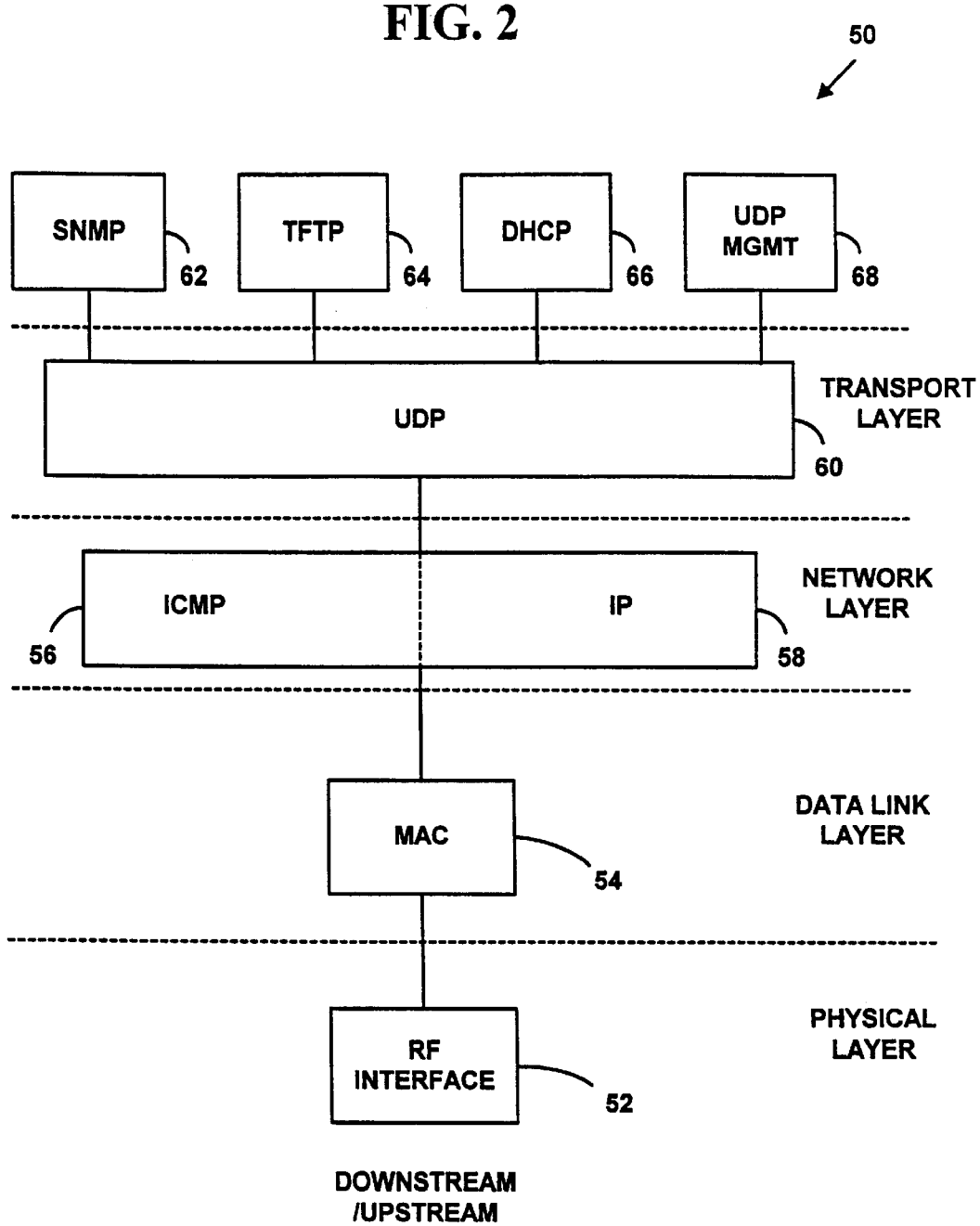
FIG. 2 is a block diagram illustrating a protocol stack for a cable modem.

FIG. 2 is a block diagram illustrating a protocol stack 50 for the CM 28. FIG. 2 illustrates the downstream and upstream protocols used in the CM 28. As is known in the art, the Open System Interconnection ("OSI") model is used to describe computer networks. The OSI model consists of seven layers including from lowest-to-highest, a physical, data-link, network, transport, session, application and presentation layer. The network layer places routing information into the data packets. The data link layer transmits data packets. The physical layer transmits the data packets and overhead as bits over a communication link.

For data transmission over a bi-directional data-over-cable system, the CM 28 is connected to the cable network 26 in a physical layer via a Radio Frequency ("RF") Interface 52. In an exemplary preferred embodiment of the present invention, the RF Interface 52 has an operation frequency range of 50 Mega-Hertz ("MHz") to 1 Giga-Hertz ("GHz") and a channel bandwidth of 6 MHz on the downstream channels. In another exemplary preferred embodiment of the present invention, the RF Interface 52 has an operation frequency range of 5 MHz to 42 MHz on the upstream channels. However, other operation frequencies and bandwidths may also be used and the invention is not limited to these frequencies and bandwidths. The RF interface 52 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 52 for downstream transmission. In another embodiment of the present invention, QAM-16 or Quadrature Phase-Shift-Keying ("QPSK") is used for upstream transmission. In this embodiment, the symbol rate of upstream transmission may be 160, 320, 640, 1,280, or 2,560 kilo-symbols per second ("ksym/sec") for 16-QAM, or 160, 320, 640, 1,280, or 2,560 ksym/sec for QPSK. However, other operating frequencies, modulation methods, and symbol rates could also be used. More information may be found in DOCSIS. Other information on the RF interface 52 can be found in the Institute of Electrical and Electronic Engineers ("IEEE") standard 802.14 for cable modems incorporated herein by reference. IEEE standards can be found at the IEEE World Wide Web Site. However, other RF interfaces 52 could also be used and the present invention is not limited to IEEE 802.14.

Above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. Other information can be found in the IEEE 802.14 for cable modems. However, other MAC layer protocols 54 could also be used and the present invention is not limited to IEEE 802.14 MAC layer protocols.

Above both the downstream and upstream protocol layers in a network layer 52 is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. For more information on the IP 58 see RFC-791 incorporated herein by reference.

The Internet Control Message Protocol ("ICMP") layer 56 is used for network management. The main functions of the ICMP layer 56, hereinafter ICMP 56, include error reporting, reachability testing (e.g., "pinging") congestion control, route-change notification, performance, subnet addressing and others. Since the IP 58 is an unacknowledged protocol, datagrams may be discarded and the ICMP 56 is used for error reporting. For more information on the ICMP 56 see RFC-792 incorporated herein by reference.

Above the IP 58 and the ICMP 56 is a transport layer with a User Datagram Protocol layer 60 ("UDP"). The UDP layer 60, hereinafter UDP 60, roughly corresponds to OSI layer 4, the transport layer, but is typically not defined as part of the OSI model. As is known in the art, the UDP 60 provides a connectionless mode of communications with datagrams. For more information on the UDP 60 see RFC-768 incorporated herein by reference.

Above the network layer are a Simple Network Management Protocol ("SNMP") layer 62, a Trivial File Protocol ("TFTP") layer 64, a Dynamic Host Configuration Protocol ("DHCP") layer 66 and a UDP manager 68. The SNMP layer 62 is used to support network management functions. For more information on the SNMP layer 62 see RFC-1157 incorporated herein by reference. The TFTP layer 64 is a file transfer protocol used to download files and configuration information. For more information on the TFTP layer 64 see RFC-1350 incorporated herein by reference. The DHCP layer 66 is a protocol for passing configuration information to hosts on an IP 54 network. For more information on the DHCP layer 66 see RFC-1541 incorporated herein by reference. The UDP manager 68 distinguishes and routes packets to an appropriate service (e.g., a virtual tunnel). More or few protocol layers could also be used with a data-over-cable system 16.

An operating environment for the CM 28 and other network devices of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical signals represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Upstream Data Transmission

The upstream channel may be viewed as time-divided into a stream of mini-slots. A mini-slot is used as a unit of granularity for upstream transmission opportunities. A CM 28 is permitted to transmit on an upstream channel during a transmission mini-slot allocated by the CMTS 30. When a CM 28 wishes to transmit data it must first request permission from the CMTS 30. The CMTS 30 receives requests from a selection of cable modems that wish to transmit and may allocate one or more transmission mini-slots to each of the cable modems. The cable modems alternately transmit during the mini-slots. Mini-slots are timed to prevent collisions between the transmissions from different cable modems.

Figure 3:
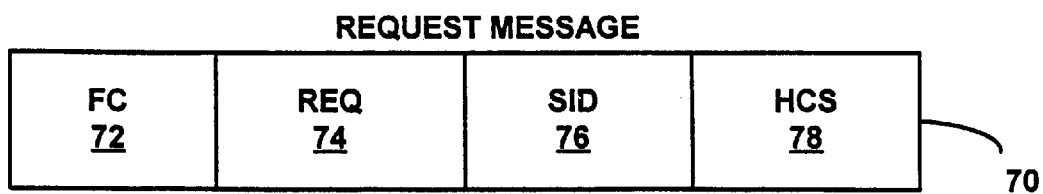
FIG. 3 is a block diagram illustrating the structure of a Request message.

A CM 28 that wishes to transmit sends a Request MAC 54 message to the CMTS 30. FIG. 3 is a block diagram illustrating a structure of a Request message. The Request message 70 includes a frame control field 72 ("FC"), a bandwidth request field 74 ("REQ"), a service identifier field 76 ("SID"), and a MAC 54 header check sequence field 78 ("HCS"). Descriptions for the Request message 70 fields are shown in Table 1.

TABLE 1

| Request message 70 Parameter | Description |
|---|---|
| FC 72 | Frame control. Identifies type of MAC 54 message. |
| REQ 74 | Total amount of bandwidth requested in mini-slots. |
| SID 76 | Service Identifier for the CM 28 that sent the REQ message. |
| HCS 78 | MAC 54 header check sequence. |

The SID 76 is a unique identifier for the CM 28 that is requesting permission to transmit. The SID 76 may be assigned by the CMTS 30 when the CM 28 initializes and registers with the CMTS 30. The REQ 74 field contains a measure of how much bandwidth, i.e. mini-slots, the CM 28 requests for the transmission of its data to the CMTS 30.

Figure 4:
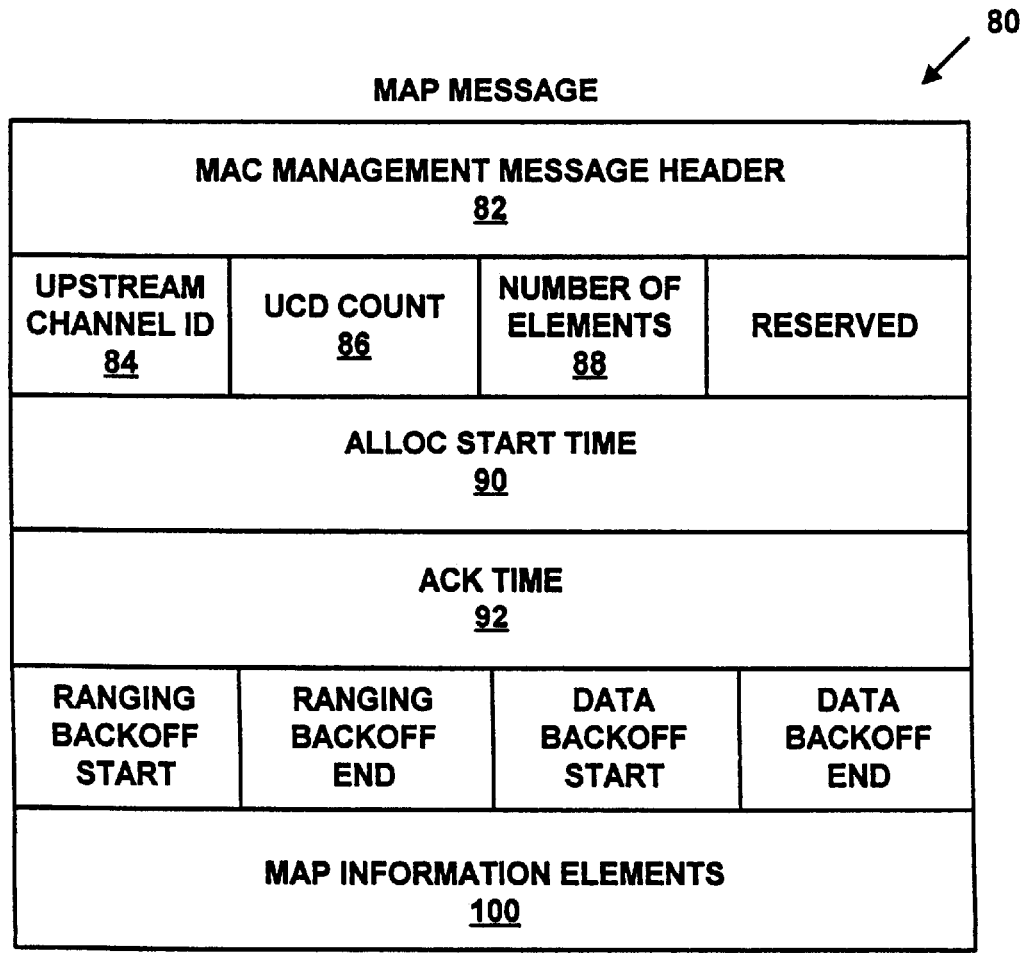
FIG. 4 is a block diagram illustrating the structure of a MAP message.

In response, the CMTS 30 builds an Upstream Bandwidth Allocation Map message ("MAP") and transmits it via the downstream channel to all cable modems. FIG. 4 is a block diagram illustrating the structure of a MAP message. The MAP message 80 includes a MAC 54 management header field 82, an upstream channel identifier field 84, a upstream channel descriptor count field 86 ("UCD Count"), a number of elements field 88, a reserved field, an allocation start time field 90 ("Alloc Start Time"), an acknowledgement time field 92 ("Ack Time"), a ranging backoff start field 94, a ranging backoff end field 96, a data backoff start field 98, a data backoff end field 100, and a MAP information elements field 102. Descriptions for the MAP message 80 fields are shown in Table 2.

TABLE 2

| MAP message 80 Parameter | Description |
|---|---|
| MAC 54 Management Message Header 84 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |
| Ack Time 92 | Latest time, from CMTS initialization, (mini-slots) processed in upstream. |
| Ranging Backoff Start | Initial back-off window for initial ranging contention. |
| Ranging Backoff End | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems of the allocation of mini-slots for a scheduled upstream usage interval and when to begin the usage interval. In a given upstream usage interval, selections of the CMs 28 alternately transmit on the upstream channel. As is known in the art, each upstream usage interval is composed of transmission intervals, also referred to as "bursts", which comprise at least one mini-slot.

An identifier for the upstream channel to which the MAP message 80 applies is placed in the Upstream Channel ID field 84. The MAP Information Elements field 100 designates the order and duration of the transmissions from the CMs. Each transmission may be described by one element. The number of elements in the MAP Information Elements field 100 is placed in the Number of Elements field 88.

FIG. 5 is a block diagram illustrating the structure of MAP Information Elements. The MAP Information Elements 100 designate intervals for transmissions by the CMs within the usage interval. Each interval includes a field for the SID 76 of the CM 28 that is permitted to transmit in each interval. The Interval Usage Code field 102 ("IUC") informs the CM 28 what kind of transmission is permitted in the interval. The offset field 104 specifies when the transmission interval occurs. In this manner, the series of intervals permit the selection of cable modems to deliver their data packets to the CMTS 30 without the transmissions colliding on the upstream path.

The IUCs 102 are values that designate the type of transmission that is permitted in each interval. The CMs may be capable of several types of transmission. For example, the transmission may be for the purposes of ranging, allowing the CM 28 to compensate for delay on the cable network. Additionally, the transmission may be for the purpose of delivering a data packet to the CMTS 30. Two types of data transmissions are typically permitted: a short data grant or a long data grant. These data grants have corresponding IUCs 102 as described in DOCSIS. For example, a short data grant may be appropriate when the CPE 14 only has a small amount of data to transmit on the upstream channel, such as a few keystrokes or the opening of a hyperlink on a web page. A long data grant may be appropriate when the CPE 14 requests to transfer a file through the backbone network 12. However, other field settings for the Request message 70, the MAP message 80, and the MAP Information Elements 100 are possible and it should be understood that other field structures and values could be used for the present invention.

Parameters for Data Transmission

Additionally, data packets that are transmitted in adjacent mini-slots may be transmitted according to different transmission formats for the RF interface 52. The formats are associated with parameters for data transmission. In one exemplary preferred embodiment of the present invention, the parameters for upstream data transmission include the symbol rate, the upstream channel frequency, the modulation type, the preamble, and Forward Error Correction ("FEC") parameters as described in Table 3.

TABLE 3

| Parameter for data transmission | Description |
| --- | --- |
| Frequency | Center frequency of upstream channel (Hz). |
| Symbol rate | Multiples of base rate of 160 ksym/sec. |
| Modulation type | QPSK or 16-QAM. |
| Preamble | Training sequence of bits used for automatic gain control and modulation. |
| FEC level (T) | Amount of redundant bytes that are added to correct for errors. |
| FEC data coverage size (k) | Amount of bytes over which error correction is to be performed. |

As is known in the art, FEC adds redundant bits to the data packet to detect, locate, and correct transmission errors. The FEC level ("T") is a measure of the amount of redundant data that must be added to the data packet to allow for error correction. A higher value of T provides a better level of error correction. The FEC data coverage size ("k") is a measure of the amount of information over which data correction is to be performed. For the same FEC level, an increase in the FEC data coverage size will result in more errors going uncorrected. It should be understood that many more data transmission parameters are possible and that the present invention is not restricted to the parameters described herein.

Figure 6:
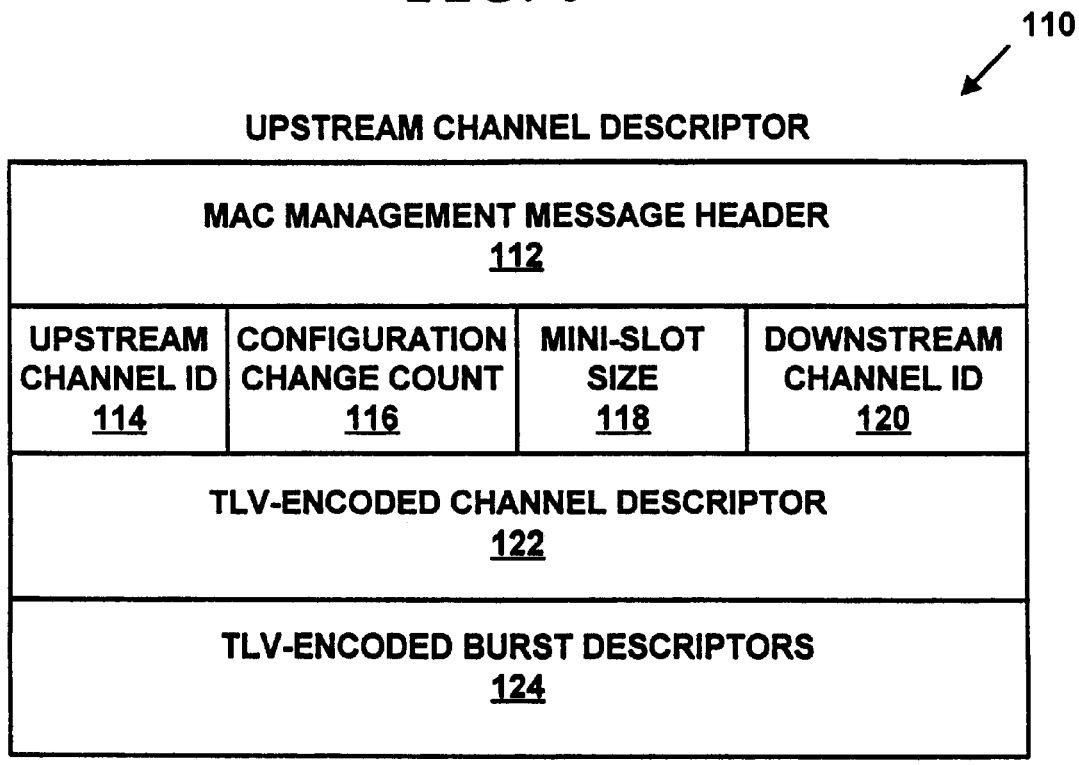
FIG. 6 is a block diagram illustrating the structure of a UCD message.

Each CM 28 transmitting in an upstream usage interval may transmit according to a different transmission format. Additionally, between upstream usage intervals, the CMs may each undergo reconfiguration so that their future transmissions occur according to another format. The CMTS 30 may reconfigure the CMs by issuing an Upstream Channel Descriptor ("UCD") message. FIG. 6 is a block diagram illustrating the structure of a UCD message. The UCD message 110 includes a MAC 54 Management Message Header field 112, an upstream channel identifier field 114, a configuration change count field 116, a mini-slot size field 118, a downstream channel identifier field 120, a type-length-value ("TLV") encoded channel information field 122, and TLV encoded burst descriptor field 124. Descriptions for the UCD message 110 fields are shown in Table 4.

TABLE 4

| UCD message 110 Parameter | Description |
| --- | --- |
| MAC 54 Management Message Header 112 | The header of this message identifying it as a UCD message. |
| Upstream Channel ID 114 | The identifier of the upstream channel to which this message belongs. |
| Configuration Change Count 116 | CMTS increments by one whenever any descriptors change. |
| Mini-Slot Size 118 | The duration of a mini-slot. |
| Downstream Channel ID 120 | The identifier of the downstream channel on which this message has been transmitted. |
| TLV Encoded Channel Descriptors 122 | Data blocks which describe the parameters for data transmission to be implemented for the overall channel. |
| TLV Encoded Burst Descriptors 124 | Data blocks which describe the parameters for data transmission to be implemented for each burst. |

TLV encoding is known to those skilled in the art. A selection of parameters for the overall channel and the bursts are given in Table 3. These parameters may be encoded as channel or burst descriptors and incorporated into a UCD message 110 to reconfigure cable modems. However, it should be understood that other field structures and values for the UCD message 110 could be used for the present invention.

When the CMTS 30 changes the data transmission parameters for an upstream channel, it builds a UCD message 110 with channel and/or burst descriptors that correspond to the new parameters. The UCD message 110 is sent on the downstream channel 26 to the CMs 28. The CMTS 30 also sends out a corresponding MAP message 80. The burst descriptors in the UCD message 110 correspond to the IUC fields 102 of the MAP Information Elements 100 of the MAP message 80. As each CM 28 transmits on the upstream it may be doing so according to data transmission parameters that are different from other CMs. In this manner, the CMs within an upstream usage interval may alternately transmit data packets to the CMTS 30 according to independent data transmission parameters.

Exemplary Determination of Sources of RF Impairment

An impairment in the ability of the data-over-cable system to transmit data from the CMs 28 to the CMTS 30 may manifest itself in many ways. By monitoring the system and collecting a variety of data on propagation conditions, however, it may be possible to recognize the presence of an impairment and pinpoint its source. Once identified, the cable operator may be able isolate the source of impairment and restore optimal transmission conditions to the system. Possible sources of RF impairment include faulty modems, overdriven O/E nodes, and external RF interferers such as amateur radio broadcasts or leaky digital cable TV boxes.

Figure 7A:
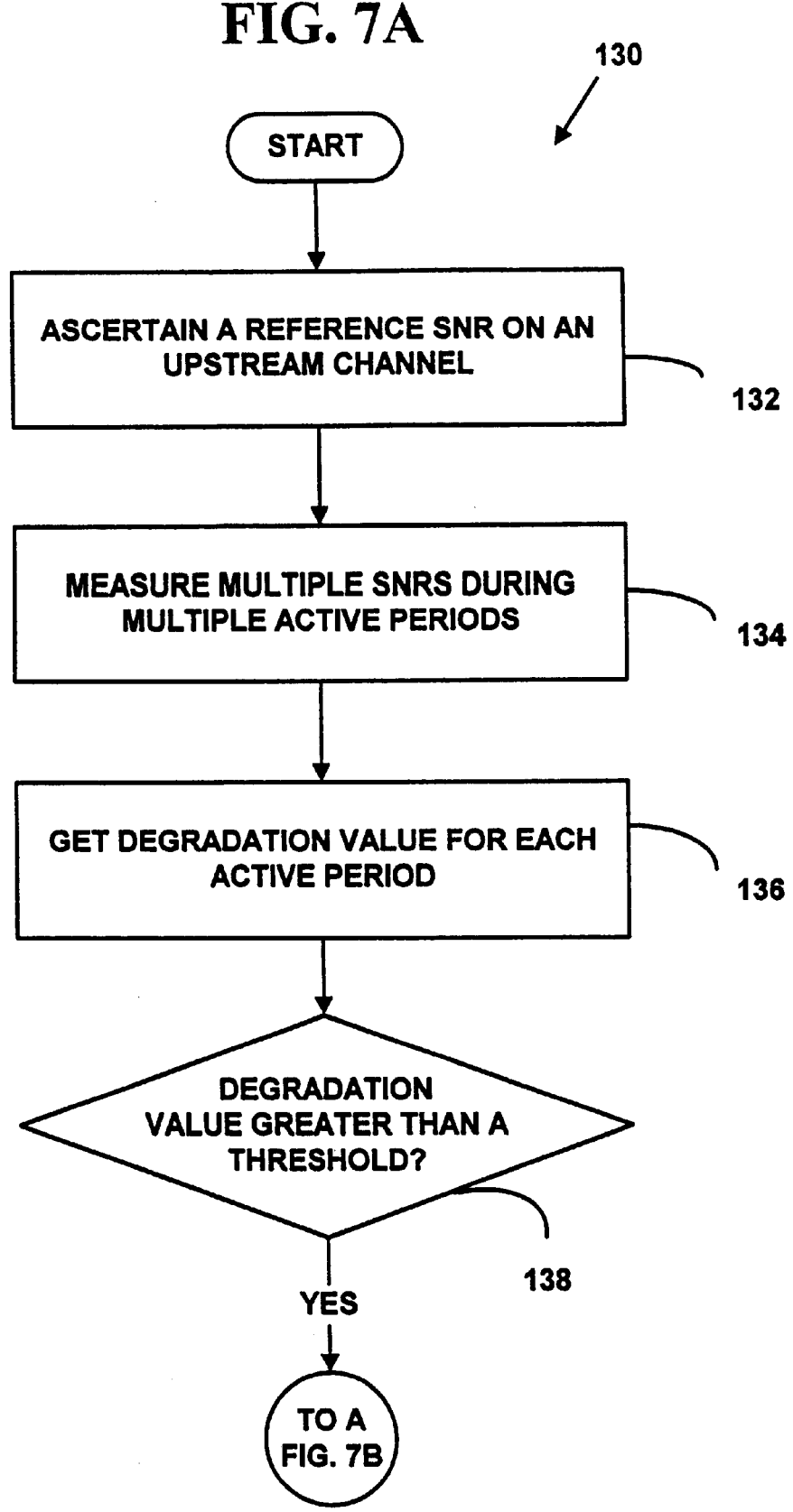
FIG. 7 is a flow diagram illustrating a method for determining a source of RF impairment.
Figure 7B:
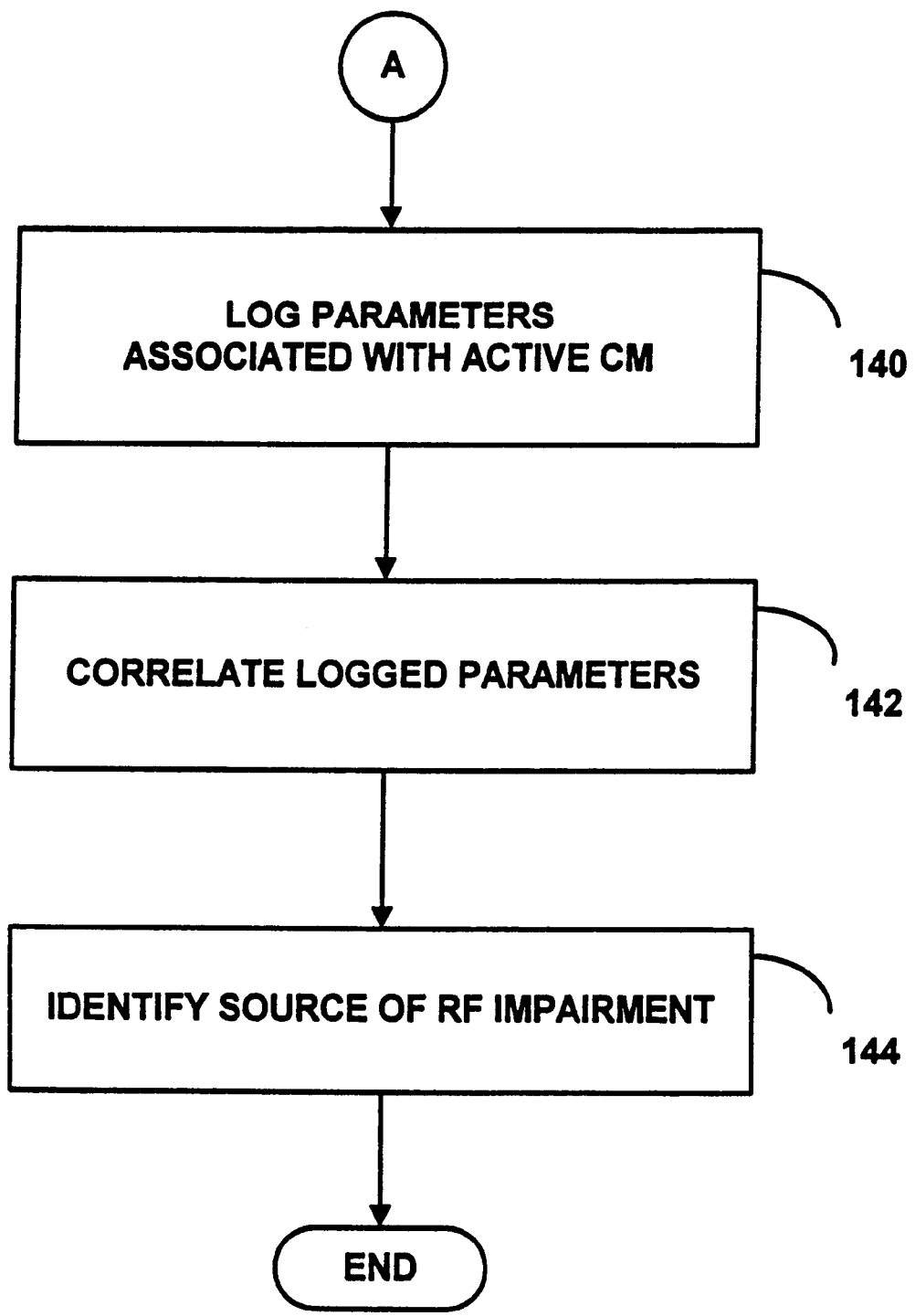

FIG. 7 is a flow diagram illustrating a Method 130 for determining a source of RF impairment. The Method 130 includes ascertaining a reference signal-to-noise ratio ("SNR") on an upstream channel at Step 132. The reference SNR is ostensibly a measure of the SNR that may be achieved for CM 28 transmissions. Deviations from the reference SNR may imply RF impairment. At Step 134, multiple SNRs are measured during multiple active periods. An active period is when only one CM 28 transmits on the upstream channel. A degradation value for each measured SNR is obtained at Step 136. The degradation value may be obtained by comparing the measured SNR to the reference SNR and is a measure of signal degradation on the upstream channel. For example, one possible degradation value may be the difference between the reference SNR and the measured SNR although other methods for quantifying degradation may be used and the present invention is not limited to the difference between SNRs.

At Step 138, it is determined whether the degradation value is greater than a threshold. In one exemplary preferred embodiment a user, such as a technician or cable operator, defines the threshold. Exceeding the threshold may indicate impairment in the propagation of RF signals on the upstream channel. If the threshold is exceeded, parameters associated with the CM 28 that is active during the active period are logged at Step 140. Continued logging keeps a record of which CMs 28 are transmitting when an impairment occurs. At Step 142, the logged parameters are correlated. Correlation between the logged parameters may provide information as to the source of the RF impairment. At Step 144, the source of the RF impairment is identified. In this manner, the monitoring of data transmissions on the data-over-cable system may indicate the presence of a RF impairment and identify its source.

Exemplary Ascertaining of the Reference SNR

In one exemplary preferred embodiment of the present invention, the Step 132 of ascertaining a reference SNR on the upstream channel is performed on the CMTS 30. For example, the CMTS 30 may have the capability of measuring the noise floor on the upstream channel and converting it to a value for the reference SNR. Alternately, the CMTS 30 may directly measure the reference SNR for data transmissions by methods known to those skilled in the art. However, the present invention is not restricted to ascertaining the reference SNR on the CMTS 30 and the reference SNR may be ascertained at other points and on other devices in the cable system.

Figure 8:
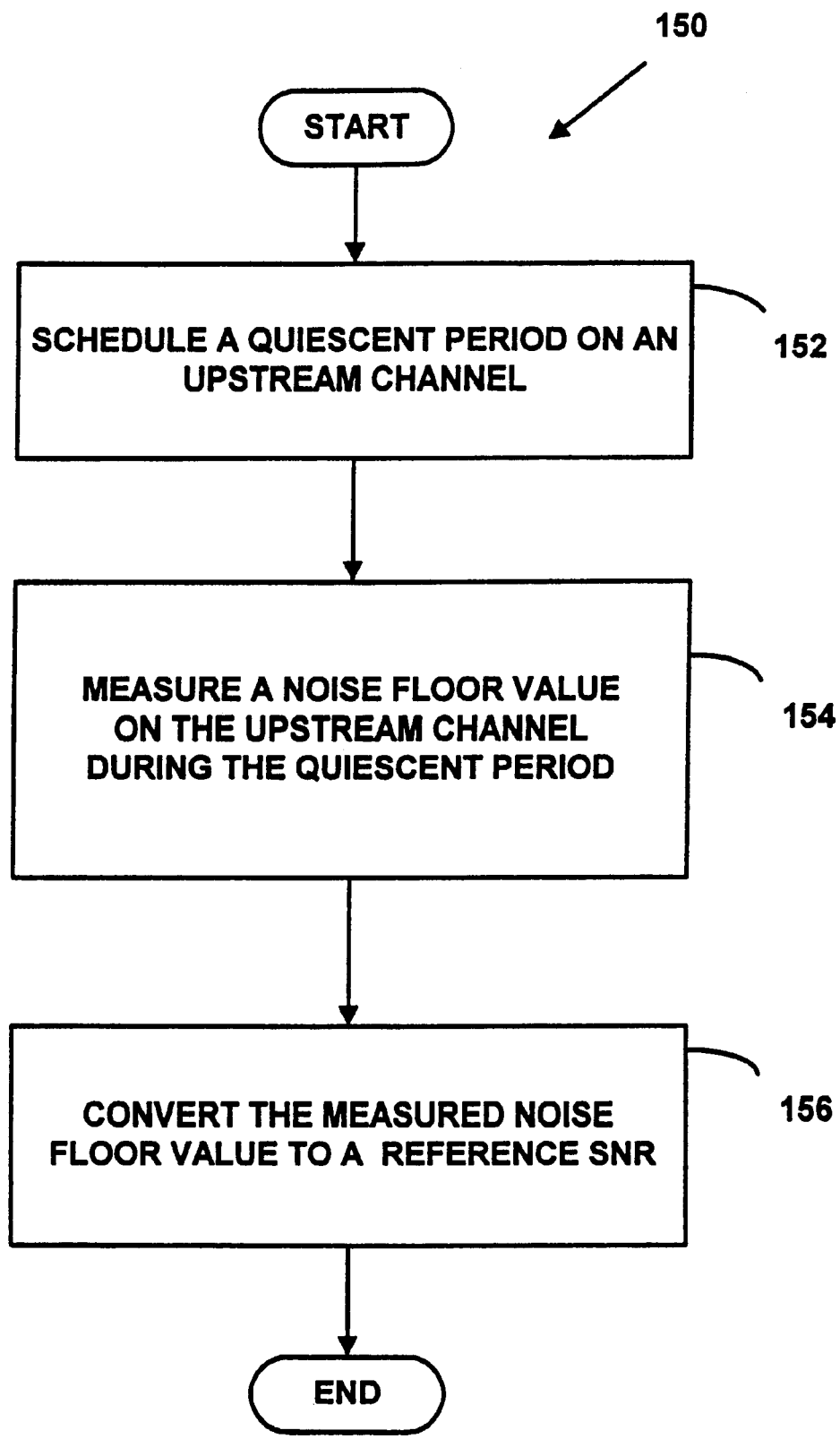
FIG. 8 is a flow diagram illustrating a method for ascertaining a reference SNR on an upstream channel.

FIG. 8 is a flow diagram illustrating a Method 150 for ascertaining a reference SNR on an upstream channel. Method 150 includes scheduling a quiescent period on the upstream channel at Step 152, measuring a noise floor value on the upstream channel during the quiescent period at Step 154, and converting the measured noise floor value to the reference SNR at Step 156. Quiescent periods are where no data is transmitted by the cable modems on the upstream channel. For example, the cable system may be capable of providing a measurement of the noise floor on the upstream channel. The noise floor value is a measure of RF power within the bandwidth for the upstream channel when no data is being transmitted. The CMTS 30 may be designed to operate at a constant upstream carrier power level. The value of the noise floor in combination with the value of the designed carrier power level may be converted to a reference SNR.

In one exemplary preferred embodiment, the reference SNR is measured at the bandwidth of the upstream channel. In yet another exemplary preferred embodiment, the SNR for the upstream bandwidth may be converted to a value for a nominal bandwidth by methods known to those skilled in the art. For example, the bandwidth of the upstream channel may depend on the configuration of the cable system. Some configurations may provide a single upstream channel with a larger bandwidth whereas other configurations may provide multiple upstream channels with smaller bandwidths. Converting the SNRs for each bandwidth to a SNR for a nominal bandwidth may provide for a determination of sources of impairment that is not dependent on the configuration of the data-over-cable system.

In yet another exemplary preferred embodiment, the Step 132 of ascertaining a reference SNR on the upstream channel comprises scheduling multiple quiescent periods on the upstream channel, measuring noise floor values on the upstream channel during the quiescent periods, averaging the measured noise floor values to obtain an average noise floor value, and converting the average noise floor value to the reference SNR. A single noise floor measurement may be insufficient to ascertain a SNR for an upstream channel. As an illustrative example, a data-over-cable system with multiple upstream channels may encounter "cross-talk" between upstream channels. A quiescent period for a first upstream channel may coincide with an active period or a quiescent period on a second upstream channel. A measurement of the noise floor on the first upstream channel would vary depending on whether the second upstream channel were active or not. Averaging the noise floor values over a plurality of quiescent periods may provide a more reliable ascertaining of the reference SNR than would a single noise floor measurement.

A quiescent period is when no CMs 28 are transmitting on the upstream channel. In one exemplary preferred embodiment, such a period may be orchestrated by building a MAP message 80 of FIG. 4 and sending it to the CMs 28 on a downstream channel. The Upstream Channel ID field 84 of the MAP message 80 identifies the upstream channel in which quiescent periods are to be scheduled. The MAP Information Elements 100 of FIG. 5 define the transmission intervals, any number of which may be a quiescent period. In another exemplary preferred embodiment, the Service Identifier field 76 of at least one transmission interval contains an unassigned SID 76. The SIDs 76 may be assigned to the CMs 28 when they initialize or register and the SIDs 76 may be drawn from a pool of SIDs 76. As the CMs 28 register and the SIDs 76 are assigned, the pool of available SIDs 76 is reduced. There will remain unassigned SIDs 76 in the pool and the unassigned SIDs 76 are not associated with any CM 28. As there are no CMs associated with an unassigned SID 76, placing the unassigned SID 76 in the SID field 76 of a MAP Information Element 100 results in no transmission by any CM 28 on the upstream channel during the transmission interval. The transmission interval associated with the unassigned SID 76 is a quiescent period.

An example of scheduling a quiescent period may be made with reference to FIG. 9. FIG. 9 is a timeline diagram illustrating an upstream usage interval 160. In this illustration, the upstream usage interval is divided into five intervals. A first interval is defined between times 162 and 164, a second interval is defined between times 164 and 166, a third interval is defined between times 166 and 168, a fourth interval is defined between times 168 and 170, and a fifth interval is defined between times 170 and 172. During the first interval, a first CM 28 with an assigned SID 76 sends its data on the upstream channel as a RF transmission 174. The Map Information Element 100 of FIG. 5 corresponding to the first interval includes the SID 76 of the first transmitting CM 28, an IUC 102 for the type of transmission 174, and an offset 104 specifying the timing of the first interval. Similarly, during the second interval, a CM 28 with an assigned SID 76 sends its data on the upstream channel as a RF transmission 176. The Map Information Element 100 of FIG. 5 corresponding to the second interval includes the SID 76 of to the second transmitting CM 28, an IUC 102 for the type of transmission 176, and an offset 104 specifying the timing of the second interval.

The Map Information Element 100 of FIG. 5 corresponding to the third interval, however, includes an unassigned SID 76. Between times 166 and 168 no CM 28 with an assigned SID 76 has been given permission to transmit. There are no transmissions on the upstream channel during the third interval, and so the third interval is a quiescent period. At time 168 the RF transmissions 178 reappear. The Map Information Elements 100 of FIG. 5 corresponding to the fourth and fifth intervals include SIDs 76 of the fourth and fifth transmitting CMs 28 respectively, IUCs 102 for the types of transmission 178 and 180, and offsets 104 specifying the timing of the fourth and fifth intervals.

However, it should be understood that the present invention is not limited to these embodiments of ascertaining reference SNR values, defining bandwidths for measurement, and scheduling quiescent periods. Other methods beyond those disclosed herein may be used.

Exemplary Identification of Sources of RF Impairment

When degradation is perceived by the crossing of a threshold, parameters associated with the active CM 28 are logged. In one exemplary preferred embodiment, the logged parameters include the measured SNR and an identification value for the active CM 28. Possible identification values 28 include a MAC 54 address for the active CM 28, an IP 58 address for the active CM 28, or a SID 76 for the active CM 28. In another exemplary preferred embodiment, the user is alerted when parameters are logged. The alarm indicates that there is a possible impairment in the data-over-cable system. Once alerted, the user may examine the log entries and discern the source of the RF impairment.

The logged parameters are correlated at Step 142 of FIG. 7. In yet another exemplary preferred embodiment, the correlations are presented to the user in tabular form. The user may scan the table of logged parameters and correlations to detect patterns or clusters in the impairment data. For example, the table may show that the identification value for only one CM 28 is logged, suggesting that the source of the RF impairment resides in this CM 28. In yet another exemplary preferred embodiment, the parameters may be presented to the user in a graphical form. A preferred technique for representing impairment data in graphical form on paper or on a screen display of a general purpose computer, with the impairment data presented in an easy to use manner, is described in my patent application filed concurrently, Ser. No. 09/322,833, "Graphical Representation of Impairment or Other Conditions in a Data-Over-Cable System", incorporated by reference herein.

Sources of impairment and their manifestations on an upstream channel during quiescent and active periods are shown in Table 5. Either a user or a machine may be able to draw a conclusion as to the source of the RF impairment based on the correlated parameters. In one exemplary preferred embodiment, the Step 144 of identifying the source of RF impairment includes concluding that the source is an interfering signal from outside the data-over-cable system. Reaching the conclusion includes determining whether the reference SNR is low. A low reference SNR may correspond to a high noise floor during a scheduled quiescent period. As no CMs 28 are scheduled to transmit during the quiescent periods the high noise floor may indicate the ingress of an external RF source into the upstream channel. Determining whether any parameters have been logged may indicate that the source of the impairment is an external RF signal that is interfering with transmission on the upstream channel. If no parameters have been logged, this may imply that the thresholds for degradation were not crossed and that the measured SNRs are comparable to the low reference SNR. Such a situation may occur when noise is continuously present on the upstream channel.

TABLE 5

| Cause of Degradation | Quiescent Period | Active Period |
| --- | --- | --- |
| Continuous Interferer | High noise floor and low reference SNR. | No CM degradations since relative to noise floor. |
| Intermittent Interferer | Random noise floor fluctuations. High noise floor or low reference SNR correlates with interferer being active. | Random CM degradation. Degradation will correlate with interferer being active. |
| Faulty CM 28 (during transmission) | No degradations. | Degradations only during transmission by the faulty CM. |
| O/E node 24 or CMTS 30 amplifier overdriven by CM(s) 28 | No degradations. | Degradations only during transmission by CM's that are served by the overdriven node or amplifier. |

In another exemplary preferred embodiment, the Step 144 of identifying the source of RF impairment includes concluding that the source is a faulty CM 28. Reaching the conclusion includes determining whether the reference SNR is normal. A normal reference SNR may correspond to a low noise floor during a scheduled quiescent period. As no CMs 28 are scheduled to transmit during the quiescent periods the low noise floor may indicate the absence of an external RF source into the upstream channel. Determining whether any parameters have been logged may indicate that the source of the impairment is a faulty CM 28. If the parameters that have been logged correspond to only one CM 28, this may imply that the impairment strongly correlates with this uniquely identified CM 28.

In yet another exemplary preferred embodiment, the Step 144 of identifying the source of RF impairment includes concluding that the source is a device on the upstream path that carries the transmissions on the upstream channel. The upstream path device may be an O/E node 24 or a cable network amplifier 42 in the data-over-cable system, although many other types of upstream path devices are possible and the present invention is not limited to O/E nodes or cable network amplifiers. Reaching the conclusion includes determining whether the reference SNR is normal. A normal reference SNR may correspond to a low noise floor during a scheduled quiescent period. The data-over-cable system is displaying no aberrant behavior when no CMs 28 are transmitting. Determining whether any parameters have been logged may indicate that the source of the impairment is a faulty upstream path device. If the parameters that have been logged correspond to a cluster of CMs 28, and this cluster has a particular upstream path device in common, this may imply that the impairment strongly correlates with this uniquely identified upstream path device. For example, an upstream path device may become a source of RF impairment if it is overdriven by the power of the transmissions from a CM 28. When overdriven, an O/E node 24 or amplifier may have a non-linear response, generate harmonics, and generally degrade data transmission on the upstream channel.

Additionally, the identification of the source of RF impairment may be accompanied by an alarm that alerts a user of the presence of the impairment. For example, a technician may be notified as to the identity of a CM 28 or an O/E node 24 that is the cause of the impairment and may take appropriate steps to isolate the suspect device from the cable network. It should be understood, however, that the present invention is not limited to these embodiments and other methods for identifying the source of RF impairment may be possible.

Figure 10B:
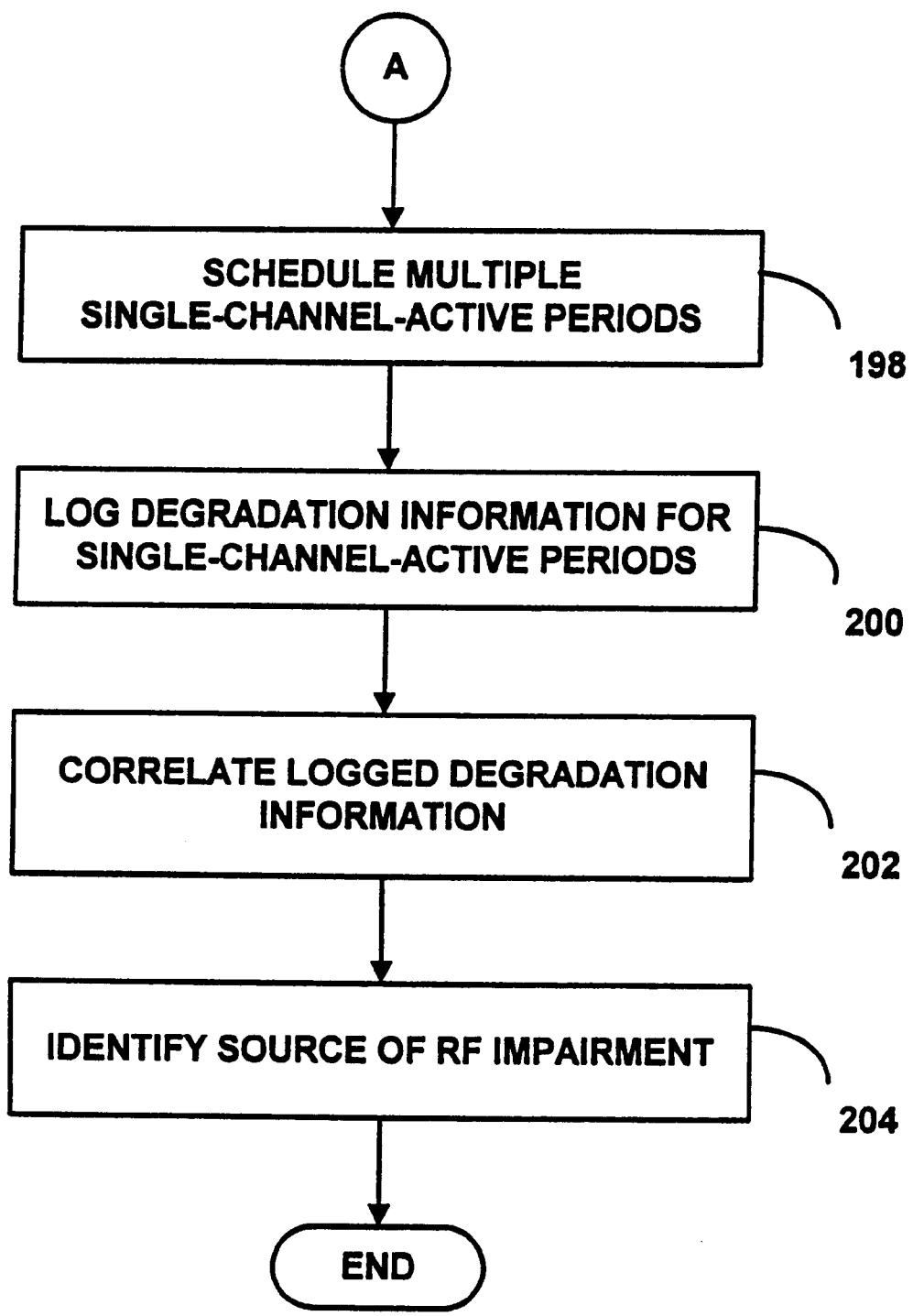
FIG. 10 is a flow diagram illustrating a method for determining a source of RF impairment.

Exemplary Determination of Sources of RF Impairment on Multiple Upstream Channels Monitoring several upstream channels simultaneously may also provide information on the data transmission properties of a data-over-cable system. FIG. 10 is a flow diagram illustrating a Method 190 for determining a source of RF impairment. Method 190 includes ascertaining multiple reference SNRs, each corresponding to an upstream channel, at Step 192. At Step 194, multiple all-channels-active periods are scheduled. An all-channels-active period is when all upstream channels are simultaneously active and only one cable modem is transmitting on each of the active upstream channels. Degradation information for the all-channels-active periods is logged at Step 196. Multiple single-channel-active periods are scheduled at Step 198. A single-channel-active period is when only one upstream channel is active and only one cable modem is transmitting on the active upstream channel. At Step 200, degradation information for the single-channel-active periods is logged. The logged degradation information is correlated at Step 202 and the source of radio frequency impairment is identified at Step 204. In this manner, the monitoring of data transmissions on the data-over-cable system may indicate the presence of a RF impairment and identify its source.

In one exemplary preferred embodiment, ascertaining multiple reference SNRs is performed on the CMTS 30. As described above, for example, the CMTS 30 may have the capability of measuring the noise floors on the upstream channels and converting them to values for the reference SNRS. Alternately, the CMTS 30 may directly measure the reference SNRs for data transmissions by methods known to those skilled in the art. However, the present invention is not restricted to ascertaining the reference SNRs on the CMTS 30 and the reference SNRs may be ascertained at other points and on other devices in the cable system.

Figure 11:
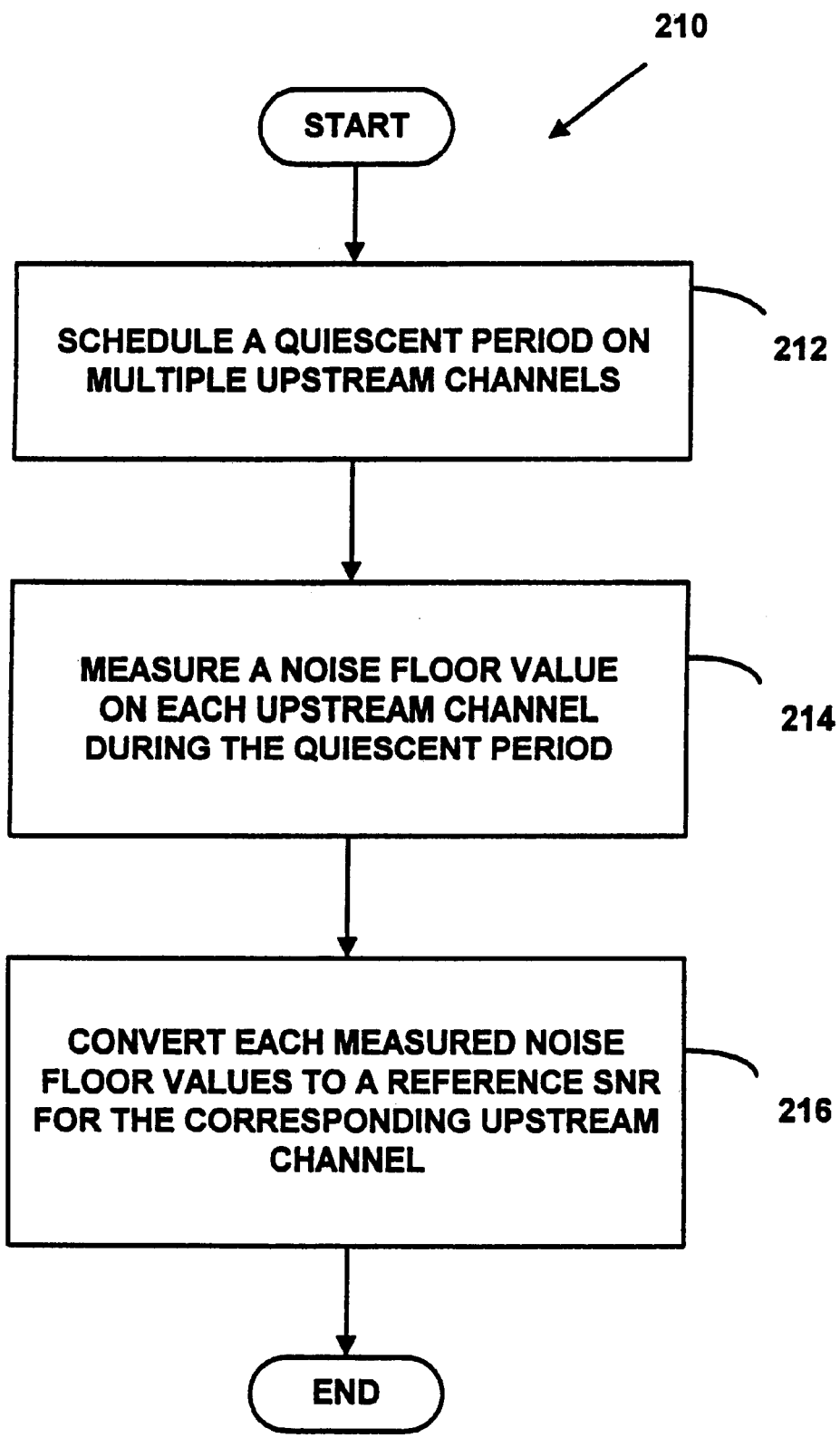
FIG. 11 is a flow diagram illustrating a method for ascertaining a reference SNRs on multiple upstream channels.

FIG. 11 is a flow diagram illustrating a Method 210 for ascertaining reference SNRs on multiple upstream channels. Method 210 includes scheduling a quiescent period on the upstream channels at Step 212, measuring a noise floor value on each upstream channel during the quiescent period at Step 214, and converting each measured noise floor value to a reference SNR for the corresponding upstream channel at Step 216. Quiescent periods are where no data is transmitted by the cable modems on the upstream channels. For example, as described above, the cable system may be capable of providing a measurement of the noise floor on each upstream channel and the CMTS 30 may be designed to operate at a constant upstream carrier power level for each channel. The values of the noise floors in combination with the value or values of the designed carrier power level may be converted to the reference SNR for each upstream channel.

In one exemplary preferred embodiment, each reference SNR is measured at the bandwidth of the corresponding upstream channel. In yet another exemplary preferred embodiment, the SNR for each upstream bandwidth may be converted to a value for a nominal bandwidth by methods known to those skilled in the art. Using nominal bandwidth SNRs may provide for a determination of sources of impairment that is not dependent on the configuration of the data-over-cable system.

Exemplary Scheduling of Quiescent Periods

Quiescent periods, all-channels-active periods, and single-channel-active periods provide a variety of synchronized transmission conditions on the upstream channels to aid in the identification of RF impairments. For example, a CM 28 that ought to transmit on a first upstream channel may have a faulty RF interface that leaks radio frequency onto a second upstream channel. Cross-correlating information from multiple channels may identify the CM 28 as the source of the impairment.

A quiescent period is when no CMs 28 are transmitting on the upstream channels. In one exemplary preferred embodiment, such a period may be orchestrated by building multiple MAP messages 80 of FIG. 4 and sending them to the CMs 28 on a downstream channel. Each MAP message 80 corresponds to an upstream channel. The Upstream Channel ID field 84 of each MAP message 80 identifies on which upstream channel the MAP Information Elements 100 of this MAP message 80 will define transmission intervals. Each set of MAP Information Elements 100 of FIG. 5 define the transmission intervals on its respective upstream channel, any number of which intervals may be a quiescent period. In another exemplary preferred embodiment, the Service Identifier field 76 of at least one transmission interval on each upstream channel contains an unassigned SID 76. As there are no CMs associated with the unassigned SID 76, placing the unassigned SID 76 in the SID field 76 of a MAP Information Element 100 results in no transmission by any CM 28 during the transmission interval on the respective upstream channel.

In yet another exemplary preferred embodiment, the transmission intervals on each upstream channel that are associated with unassigned SIDs 76 substantially overlap and provide the quiescent period. A network device, e.g. a CMTS 30, may schedule a quiescent period by coordinating the transmissions on the upstream channels. The CMTS 30 may build MAP messages 80 that include specially arranged offset fields 104 in each of the respective MAP Information Elements 100. The offset fields 104 specify when a transmission interval occurs on an upstream channel. The offset fields 104 for each MAP message 80 may be arranged such that there will be a particular time when each upstream channel has a transmission interval that begins before the particular time and ends after the particular time. If the offset field 104 for each of the transmission intervals that span the particular time corresponds to a SID 76 field containing an unassigned SID 76, there will be no transmissions on any of the upstream channels during the particular time. It should be understood that the present invention is not limited to this method of scheduling a quiescent period and many other methods may be used.

Figure 12:
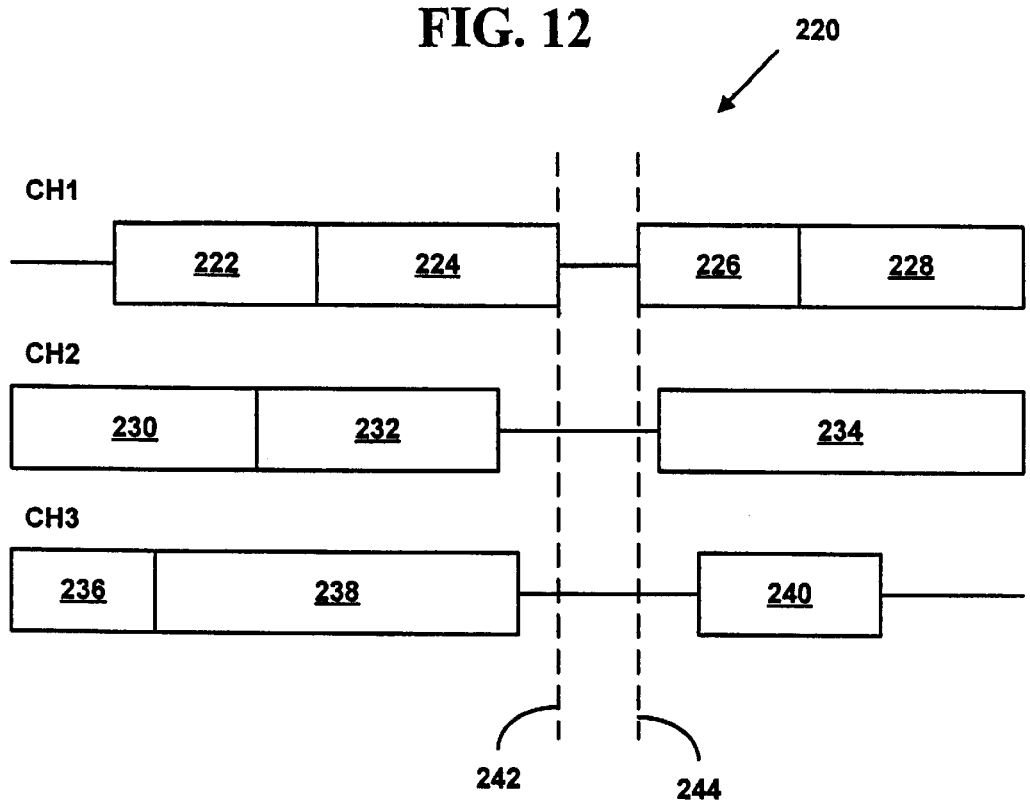
FIG. 12 is a timeline diagram illustrating a scheduled quiescent period on three upstream channels.

An example of scheduling a quiescent period may be made with reference to FIG. 12. FIG. 12 is a timeline diagram illustrating a scheduled quiescent period 220 on three upstream channels. In this illustration, on a first upstream channel ("CH1") during a first interval, a first CM 28 with an assigned SID 76 sends its data on the upstream channel as a RF transmission 222. The Map Information Element 100 of FIG. 5 corresponding to the first interval of CH1 includes the SID 76 of the first transmitting CM 28, an IUC 102 for the type of transmission 222, and an offset 104 specifying the timing of the first interval on CH1. Similarly, during the second interval on CH1, a CM 28 with an assigned SID 76 sends its data on the upstream channel as a RF transmission 224. The Map Information Element 100 corresponding to the second interval includes the SID 76 of the second transmitting CM 28, an IUC 102 for the type of transmission 224, and an offset 104 specifying the timing of the second interval on CH1. The Map Information Element 100 corresponding to the third interval, however, includes an unassigned SID 76. Between times 242 and 244 no CM 28 with an assigned SID 76 has been given permission to transmit on CH1. There are no transmissions on the upstream channel during the third interval on CH1. Similarly, the Map Information Elements 100 corresponding to the fourth and fifth intervals of CH1 include SIDs 76 of the fourth and fifth transmitting CMs 28 respectively, IUCs 102 for the types of transmission 226 and 228, and offsets 104 specifying the timing of the fourth and fifth intervals on CH1.

Contemporaneously, on a second upstream channel ("CH2") during a first interval, a first CM 28 with an assigned SID 76 sends its data on the upstream channel as a RF transmission 230. The Map Information Element 100 of FIG. 5 corresponding to the first interval of CH2 includes the SID 76 of the first transmitting CM 28, an IUC 102 for the type of transmission 230, and an offset 104 specifying the timing of the first interval on CH2. Similarly, during the second interval on CH2, a CM 28 with an assigned SID 76 sends its data on the upstream channel as a RF transmission 232. The Map Information Element 100 corresponding to the second interval includes the SID 76 of the second transmitting CM 28, an IUC 102 for the type of transmission 232, and an offset 104 specifying the timing of the second interval on CH2. The Map Information Element 100 corresponding to the third interval, however, includes an unassigned SID 76. Between times 242 and 244 no CM 28 with an assigned SID 76 has been given permission to transmit on CH2. There are no transmissions on the upstream channel during the third interval on CH2. Similarly, the Map Information Elements 100 corresponding to the fourth interval of CH2 includes a SID 76 of the fourth transmitting CM 28, an IUC 102 for the type of transmission 234, and an offset 104 specifying the-timing of the fourth interval on CH2.

Also contemporaneously, on a third upstream channel ("CH3") during a first interval, a first CM 28 with an assigned SID 76 sends its data on the upstream channel as a RF transmission 236. The Map Information Element 100 of FIG. 5 corresponding to the first interval of CH3 includes the SID 76 of the first transmitting CM 28, an IUC 102 for the type of transmission 236, and an offset 104 specifying the timing of the first interval on CH3. Similarly, during the second interval on CH3, a CM 28 with an assigned SID 76 sends its data on the upstream channel as a RF transmission 238. The Map Information Element 100 corresponding to the second interval includes the SID 76 of the second transmitting CM 28, an IUC 102 for the type of transmission 238, and an offset 104 specifying the timing of the second interval on CH3. The Map Information Element 100 corresponding to the third interval, however, includes an unassigned SID 76. Between times 242 and 244 no CM 28 with an assigned SID 76 has been given permission to transmit on CH3. There are no transmissions on the upstream channel during the third interval on CH3. Similarly, the Map Information Elements 100 corresponding to the fourth interval of CH3 includes a SID 76 of the fourth transmitting CM 28, an IUC 102 for the type of transmission 240, and an offset 104 specifying the timing of the fourth interval on CH3.

In the illustration of FIG. 12, the third period on CH1, the third period on CH2, and the third period on CH3 substantially overlap. The overlap defines a common time interval having a beginning 242 and an end 244. During the common time interval there are no transmissions on any of the upstream channels. There is a quiescent period during the common time interval. It should be understood, however, that the present invention is not restricted to three channels and with data transmissions in the form as illustrated in FIG. 12 and that a quiescent period on a data-over-cable system with more or fewer upstream channels may be achieved.

Exemplary Scheduling of All-channels-active Periods

During an all-channels-active period, all upstream channels are active simultaneously and only one CM 28 is transmitting on each of the upstream channels during that period. In one exemplary preferred embodiment, such a period may be orchestrated by building multiple MAP messages 80 of FIG. 4 and sending them to the CMs 28 on a downstream channel. Each MAP message 80 corresponds to an upstream channel. The Upstream Channel ID field 84 of each MAP message 80 identifies on which upstream channel the MAP Information Elements 100 of this MAP message 80 will define transmission intervals. Each set of MAP Information Elements 100 of FIG. 5 defines the transmission intervals on its respective upstream channel.

In another exemplary preferred embodiment, the transmission intervals on each upstream channel which are associated with assigned SIDs 76 substantially overlap and provide the all-channels-active period. A network device, e.g. a CMTS 30, may schedule an all-channels-active period by coordinating the transmissions on the upstream channels. The CMTS 30 may build MAP messages 80 that include specially arranged offset fields 104 in each of the respective MAP Information Elements 100. The offset fields 104 specify when a transmission interval occurs on an upstream channel. The offset fields 104 for each MAP message 80 may be arranged such that there will be a particular time when each upstream channel has a transmission interval that begins before the particular time and ends after the particular time. If the offset field 104 for each of the transmission intervals that span the particular time corresponds to a SID 76 field containing an assigned SID 76, there will be transmissions on all of the upstream channels during the particular time. Additionally, because there is only one transmission interval on each upstream channel that spans the particular time, typically there will be only one cable modem transmitting on each upstream channel during the particular time. It should be understood that the present invention is not limited to this method of scheduling an all-channels-active period and many other methods may be used.

Figure 13:
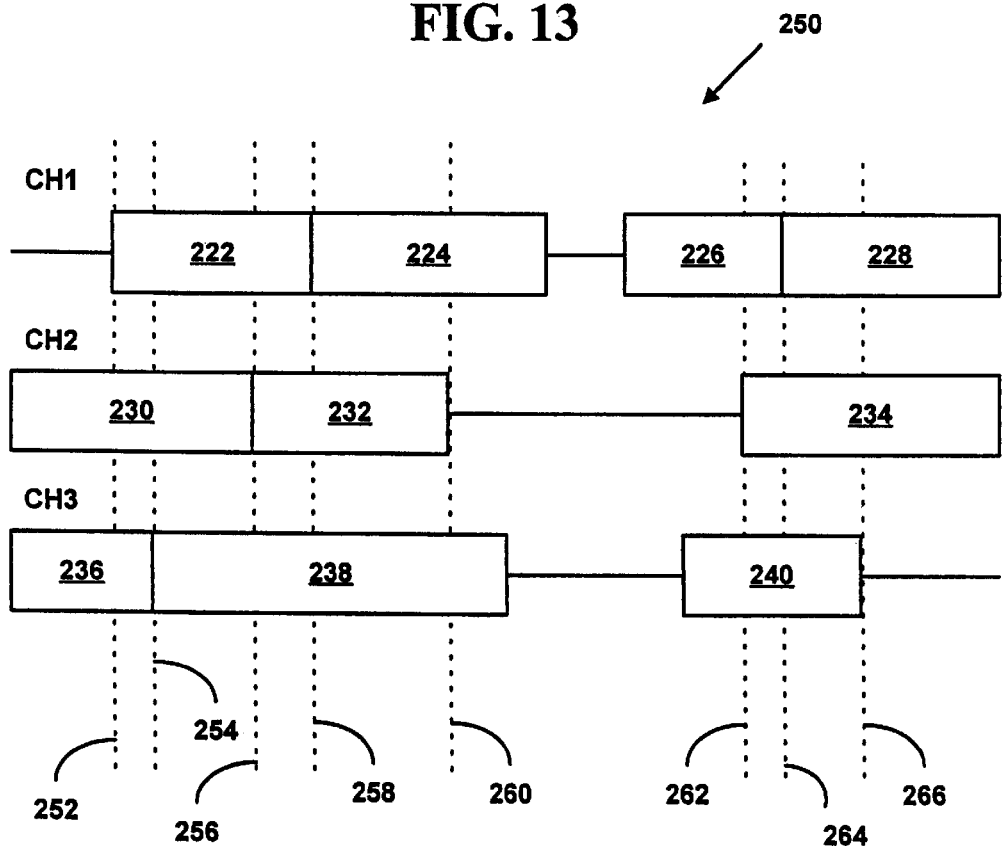
FIG. 13 is a timeline diagram illustrating a scheduled all-channels-active period on three upstream channels.

An example of scheduling an all-channels-active period may be made with reference to FIG. 13. FIG. 13 is a timeline diagram illustrating a scheduled all-channels-active period 250 on three upstream channels. The RF transmissions 222–240 have been described above. In this illustration, the first period on CH1, the first period on CH2, and the first period on CH3 substantially overlap. The overlap defines a common time interval having a beginning 252 and an end 254. During the common time interval there are transmissions on each of the upstream channels and only one CM 28 transmits on each channel during the common time interval. There is an all-channels-active period during this common time interval 252–254. Similarly, the first period 222 on CH1, the first period 230 on CH2, and the second period 238 on CH3 substantially overlap. The overlap defines a common time interval having a beginning 254 and an end 256. During the common time interval there are transmissions on each of the upstream channels and only one CM 28 transmits on each channel during the common time interval. There is another all-channels-active period during this common time interval 254–256. The time interval between the first time 252 and the third time 256 in the illustration does not define an all-channels-active period because two different CMs 28 transmit on CH3 during the time interval.

In a similar manner, it may be seen that an all-channels-active period is defined in FIG. 13 between time 256 and 258 with transmissions 222 of CH1, 232 of CH2, and 238 of CH3. Similarly, an all-channels-active period is defined between time 258 and 260 with transmissions 224 of CH1, 232 of CH2, and 238 of CH3. Similarly, an all-channels-active period is defined between time 262 and 264 with transmissions 226 of CH1, 234 of CH2, and 240 of CH3. Similarly, an all-channels-active period is defined between time 264 and 266 with transmissions 228 of CH1, 234 of CH2, and 240 of CH3. It should be understood, however, that the present invention is not restricted to three channels and with data transmissions in the form as illustrated in FIG. 13 and that all-channels-active periods on a data-over-cable system with more or fewer upstream channels may be achieved.

Exemplary Scheduling of Single-channel-active Periods

During a single-channel-active period, only one upstream channels is active and only one CM 28 is transmitting on the active upstream channel during that period. In one exemplary preferred embodiment, such a period may be orchestrated by building multiple MAP messages 80 of FIG. 4 and sending them to the CMs 28 on a downstream channel. Each MAP message 80 corresponds to an upstream channel. The Upstream Channel ID field 84 of each MAP message 80 identifies on which upstream channel the MAP Information Elements 100 of this MAP message 80 will define transmission intervals. Each set of MAP Information Elements 100 of FIG. 5 defines the transmission intervals on its respective upstream channel.

In another exemplary preferred embodiment, the transmission interval on the active upstream channel which is associated with an assigned SID 76 and the transmission intervals on the other upstream channels which are associated with unassigned SIDs 76 substantially overlap and provide the single-channel-active period. A network device, e.g. a CMTS 30, may schedule a single-channel-active period by coordinating the transmissions on the upstream channels. The CMTS 30 may build MAP messages 80 that include specially arranged offset fields 104 in each of the respective MAP Information Elements 100. The offset fields 104 specify when a transmission interval occurs on an upstream channel. The offset fields 104 for each MAP message 80 may be arranged such that there will be a particular time when each upstream channel has a transmission interval that begins before the particular time and ends after the particular time. If the offset field 104 for the transmission interval on the active upstream channel that spans the particular time is associated with a SID 76 field containing an assigned SID 76, there will be a transmission on the active upstream channel during the particular time. Additionally, if the offset field 104 for the transmission interval on the other upstream channels that spans the particular time are associated with a SID 76 field containing an unassigned SID 76, there will be no transmissions on the other inactive upstream channels during the particular time. Moreover, because there is only one transmission interval on the active upstream channel that spans the particular time, typically there will be only one cable modem transmitting on the active upstream channel during the particular time. It should be understood that the present invention is not limited to this method of scheduling a single-channel-active period and many other methods may be used.

Figure 14:
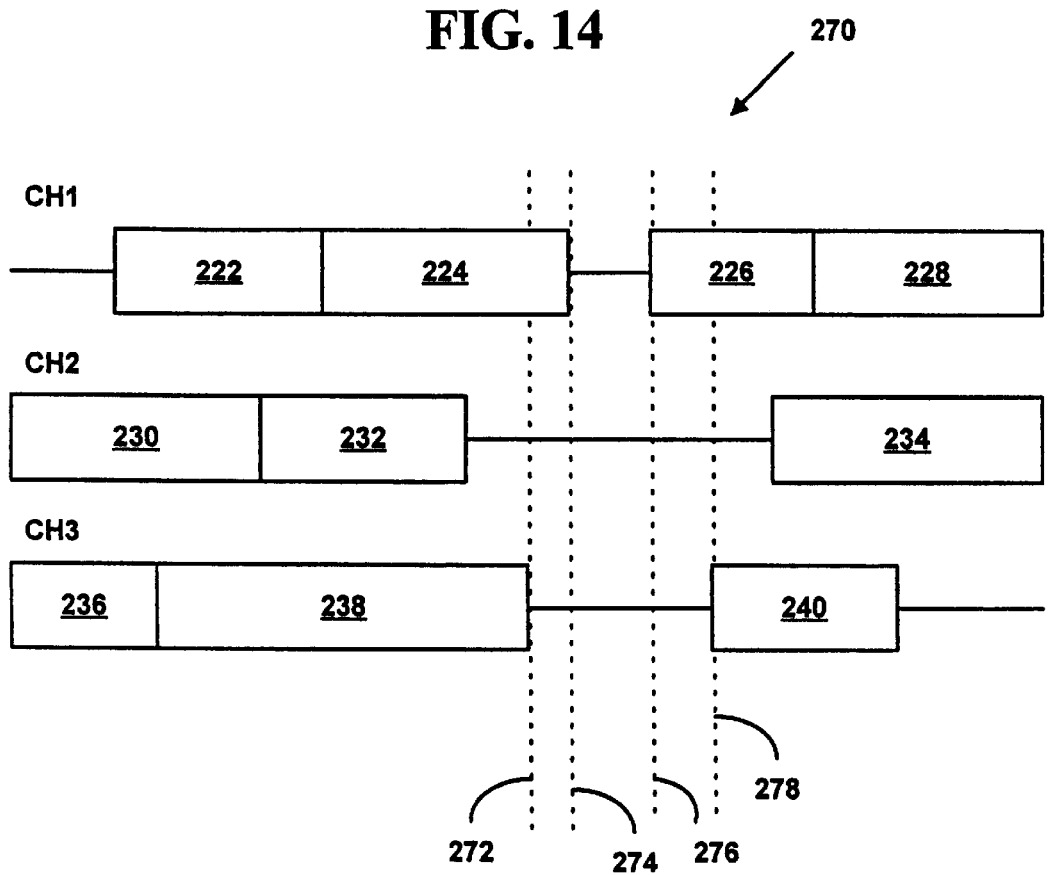
FIG. 14 is a timeline diagram illustrating a scheduled single-channel-active period on three upstream channels.

An example of scheduling a single-channel-active period may be made with reference to FIG. 14. FIG. 14 is a timeline diagram illustrating a scheduled single-channel-active period 270 on three upstream channels. The RF transmissions 222–240 have been described above. In this illustration, the second period on CH1, the third period on CH2, and the third period on CH3 substantially overlap. The overlap defines a common time interval having a beginning 272 and an end 274. During the common time interval there is one transmission 224 on the active upstream channel CH1 and only one CM 28 transmits on the active upstream channel during the common time interval. Also during the common time interval, there are no transmissions on the other inactive upstream channels, CH2 and CH3, in the time interval 272–274. There is a single-channel-active period during this common time interval 272–274. Similarly, the fourth period 226 on CH1, the third period on CH2, and the third period on CH3 substantially overlap. The overlap defines a common time interval having a beginning 276 and an end 278. During the common time interval there are transmissions on only CH1 and only one CM 28 transmits on CH1 during the common time interval. There is another single-channel-active during this common time interval 276–278. It should be understood, however, that the present invention is not restricted to three channels and with data transmissions in the form as illustrated in FIG. 14 and that single-channel-active periods on a data-over-cable system with more or fewer upstream channels may be achieved.

Exemplary Logging of Degradation Information

Figure 15:
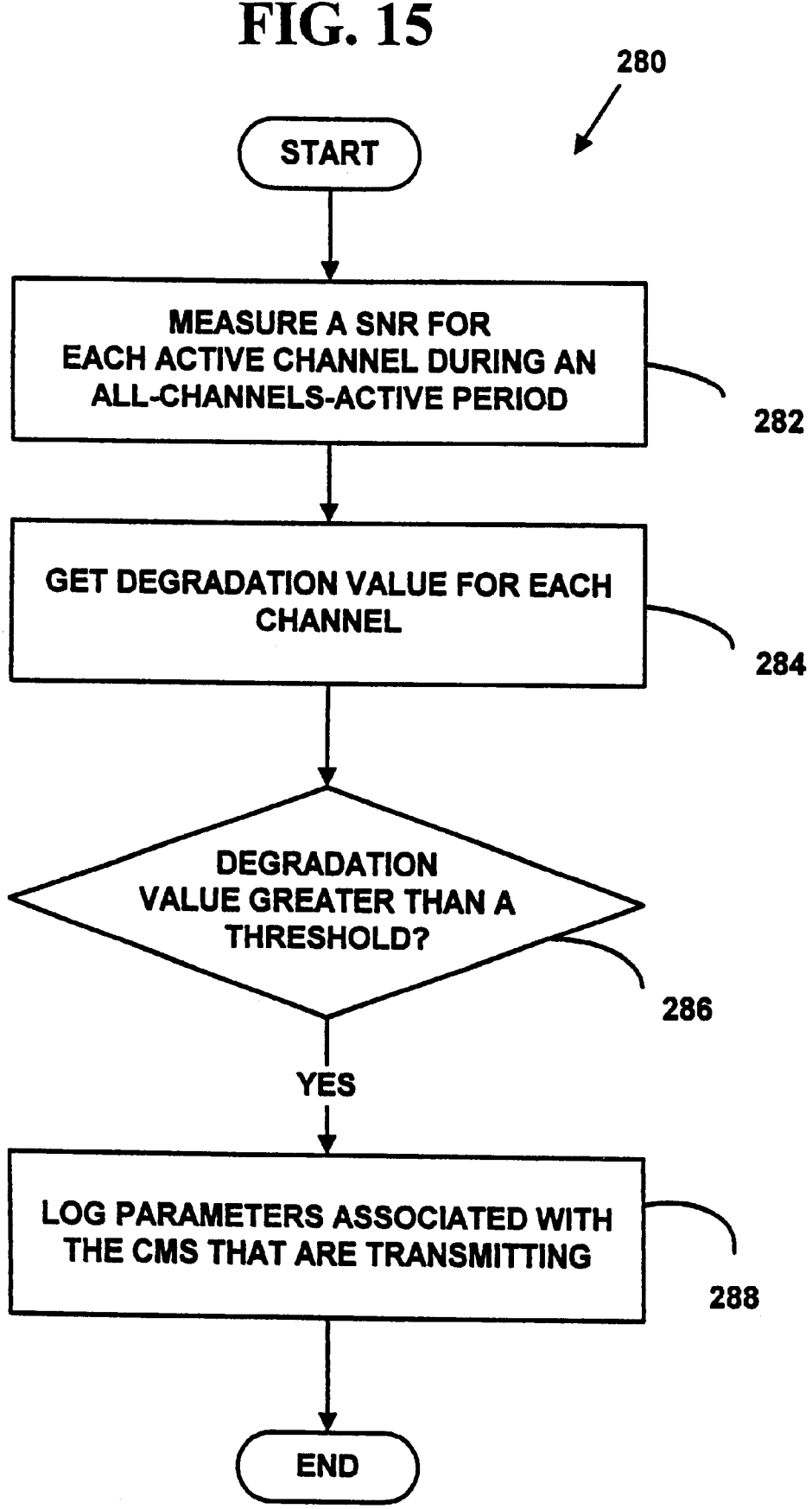
FIG. 15 is a flow diagram illustrating a method for logging degradation information for an all-channels-active period.

In Method 190 of FIG. 10, degradation information is logged for all-channels-active periods at Step 196, and for single-channel-active periods at Step 200. Correlations between the logged degradation information may indicate the source RF impairment. FIG. 15 is a flow diagram illustrating a Method 280 for logging degradation information for an all-channels-active period. The Method 280 includes measuring multiple SNRs, one for each active upstream channel during the all-channels-active period at Step 282. At Step 284, a degradation value for each channel is obtained. Each degradation value may be obtained by comparing the measured SNR for the upstream channel to the reference SNR for that channel that was determined during the quiescent period. At Step 286 it is determined whether any degradation values exceed a threshold. In one exemplary preferred embodiment a user defines the threshold. If the threshold is exceeded, the parameters associated with the CMs 28 that are transmitting during the all-channels-active period, one CM 28 for each channel, are logged at Step 288.

Each all-channels-active period may have a different permutation of CMs 28 that are transmitting on the upstream channels during the period. Monitoring during all-channels-active periods may indicate if degradation information is only logged when one particular CM 28 is transmitting regardless of the other CMs 28 in the permutation. This correlation of degradation information may imply that the source of RF impairment is the particular CM 28. The logging could occur due to the crossing of a threshold of the channel on which the particular CM 28 transmits or on one of the other channels.

Figure 16:
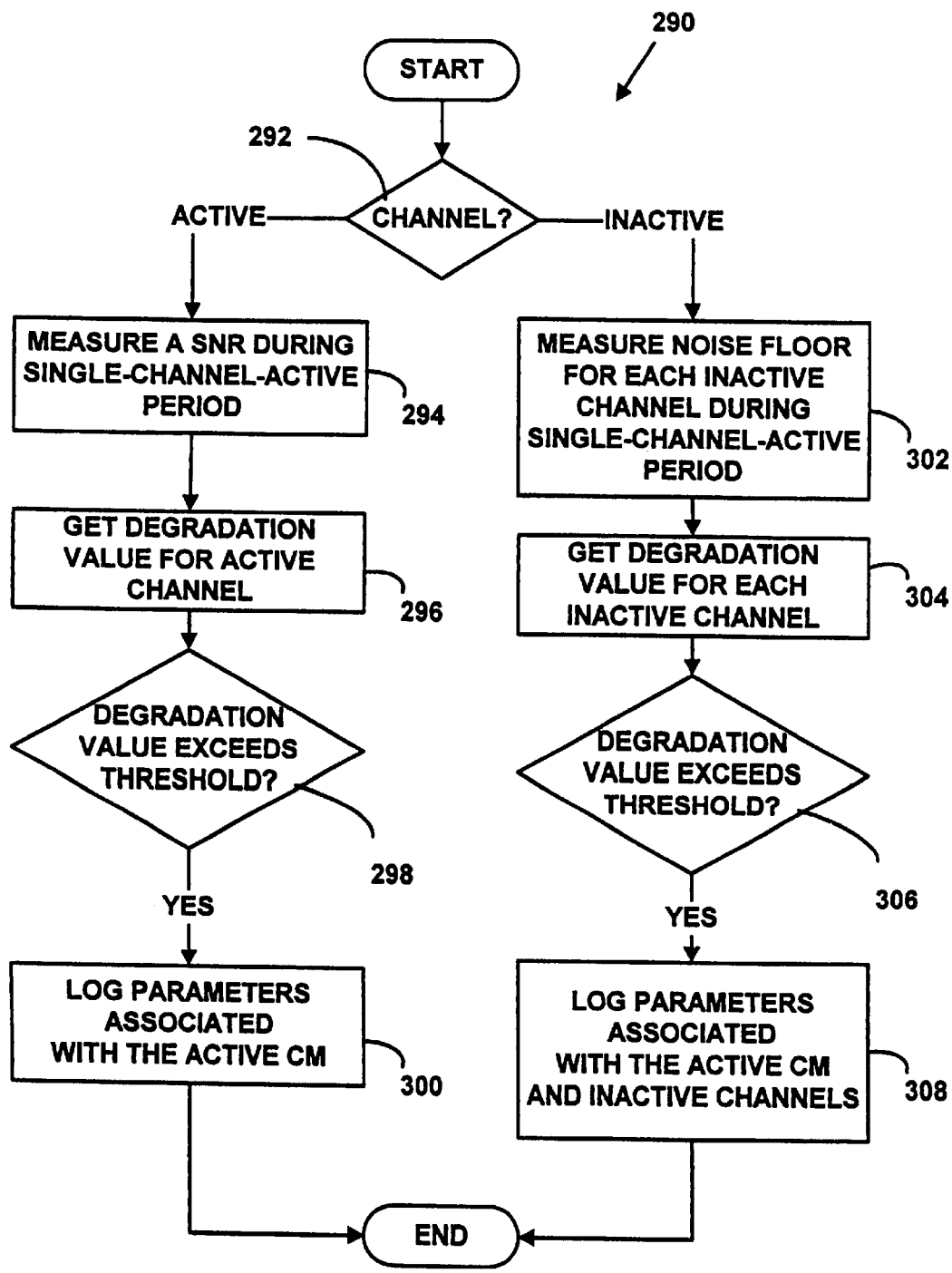
FIG. 16 is a flow diagram illustrating a method for logging degradation information for a single-channel-active period.

FIG. 16 is a flow diagram illustrating a Method 290 for logging degradation information for a single-channel-active period. The Method 290 includes steps for the active upstream channel and for the inactive upstream channels of the single-channel-active period. If the channel is recognized as active at Step 292, a SNR for the active channel is measured at Step 294. At Step 296, a degradation value is obtained for the active channel. The degradation value may be obtained by comparing the measured SNR for the active channel to the reference SNR for that upstream channel. The reference SNR was obtained during the quiescent period. At Step 298, it is determined whether the degradation value is greater than a threshold. In one exemplary preferred embodiment a user, such as a technician or cable operator, defines the threshold. If the threshold is exceeded, parameters associated with the CM 28 that is active during the active period are logged at Step 300.

If the channel is recognized as inactive at Step 292, a noise floor values for each inactive channel is measured at Step 302. At Step 304, a degradation value is obtained for each inactive channel. Each degradation value may be obtained by comparing the measured noise floor value for the inactive channel to a reference noise floor value for that upstream channel. The reference noise floor values are those measured during a quiescent period and are related to the aforementioned reference SNRs. If the CMTS 30 is designed to operate at a constant upstream carrier power level the reference noise floor may be converted to a reference SNR and vice-versa. As described above, the SNRs or noise floor values may be measured at the bandwidth of the respective inactive channel or at a nominal bandwidth. At Step 306 it is determined whether any of the degradation values for the inactive channels exceeds a threshold. In another exemplary preferred embodiment a user, such as a technician or cable operator, defines the threshold. If the threshold is exceeded, at Step 308, parameters associated with the active CM 28 on the active channel are logged, as are parameters associated with the inactive channels such as noise floor values or measured SNRs.

Each single-channel-active period may have a different CMs 28 transmitting on a different active upstream channel during the period. Similar to the monitoring of the all-channels-active periods, monitoring during single-channel-active period may indicate if degradation information is only logged when one particular CM 28 is transmitting. This correlation of degradation information may imply that the source of RF impairment is the particular CM 28.

In one exemplary preferred embodiment, the logged parameters for active modems for both the all-channels-active and single-channel-active periods may include the measured SNR and an identification value for each active CM 28. Possible identification values include a MAC 54 address for the active CM 28, an IP 58 address for the active CM 28, or a SID 76 for the active CM 28. In another exemplary preferred embodiment, the parameters that are logged at Step 308 for an inactive upstream channel during a single-channel-active period may be the noise floor value that was measured at Step 30 of Method 290. In yet another exemplary preferred embodiment, the user is alerted when any parameters are logged during all-channels-active or single-channel-active periods. The alarm alerts a user that data relating to the propagation of RF signals has been logged which may imply the presence of an RF impairment on the data-over-cable system.

Exemplary Identification of Sources of RF Impairment for Multiple Upstream channels Returning to Method 190 of FIG. 10, the logged parameters are correlated at Step 202. In yet another exemplary preferred embodiment, the correlations are presented to the user in tabular form. The user may scan the table of logged parameters and correlations to detect patterns or clusters in the impairment data. For example, the table may show that the identification value for one particular CM 28 is common to the logged parameters for single-channel-active and all-channels-active periods, suggesting that the source of the RF impairment resides in this particular CM 28. In yet another exemplary preferred embodiment, the parameters may be presented to the user in a graphical form as described in the above-referenced concurrently filed application.

Sources of impairment and their manifestations on multiple upstream channels during quiescent, single-channel-active, and all-channels-active periods are shown in Table 6. Either a user or a machine may be able to draw a conclusion as to the source of the RF impairment based on the correlated parameters.

TABLE 6

| Cause of Degradation | Quiescent Period | Single-Channel-Active Period | All-Channels-Active Period |
|---|---|---|---|
| Continuous Interferer | High noise floor and low reference SNR on the channels whose frequency overlaps with the frequency of the interfering signal. | High noise floor on the inactive channels whose frequency overlaps with the frequency of the interfering signal. No active channel degradations since relative to noise floor. | No measured degradation since relative to noise floor. |
| Intermittent Interferer | Random noise floor fluctuations on the channels whose frequency overlaps with the frequency of the interfering signal. High noise floor correlates with interferer being present. | Random noise floor fluctuations, and degradations on the active channels whose frequency overlaps with the frequency of the interfering signal. Impairments correlate with interferer being present. | Random degradation on the channels whose frequency overlaps with the frequency of the interfering signal. Degradations correlate with interferer being present. |
| Faulty CM 28 (during transmission) | No degradations. | If the noise from the faulty CM falls in the frequency of the other channels, then there will be a noise floor increase on those channels during transmission by the faulty CM. Otherwise there will be no increase in the noise floor. Degradations on the faulty CM channel (when active) only when faulty CM transmits. | Degradations on the faulty CM channel only when faulty CM transmits. If the noise from the faulty CM falls in the frequency of the other channels, those channels will also show degradations when the faulty CM transmits. |

TABLE 6-continued

| Cause of Degradation | Quiescent Period | Single-Channel-Active Period | All-Channels-Active Period |
|---|---|---|---|
| O/E node 24 or CMTS 30 amplifier overdriven by CM(s) 28 | No degradations | Degradations only during transmission by CM's that are served by the overdriven node/amplifier. If the overdriving produces impairments that fall on the other channels, then the noise floor on those channels will increase when the CM's that are overdriving the node/amplifier transmit. Otherwise there will be no noise floor degradations. | Degradations only during transmission by CM's that are served by the overdriven node/amplifier. If the overdriving produces impairments that fall on the other channels, then there will be CM degradations on those channels when the CM's that are overdriving the node/amplifier transmit. Otherwise there will be no degradation on the other channels. |

In one exemplary preferred embodiment, the Step 204 of identifying the source of RF impairment includes concluding that the source is an interfering signal from outside the data-over-cable system. Reaching the conclusion includes determining whether some of the upstream channels have low reference SNRs. A low reference SNR may correspond to a high noise floor during a scheduled quiescent period. As no CMs 28 are scheduled to transmit during the quiescent period, the high noise floor may indicate the ingress of an external RF source into the upstream channel.

Determining whether any degradation information has been logged may indicate that the source of the impairment is an external RF signal that is interfering with transmission on the upstream channel. If the same upstream channels that had low reference SNRs also display no degradation when they are the active channel in a single-channel-active period, this may imply that thresholds for degradation were not crossed and that the measured SNRs are comparable to the low reference SNRs. Additionally, if no degradation is logged during all-channels-active periods, this may also imply that the measured SNRs are comparable to the low reference SNRs. Such a situation may occur when noise is continuously present on the upstream channel.

In another exemplary preferred embodiment, the Step 204 of identifying the source of RF impairment includes concluding that the source is a faulty CM 28. Reaching the conclusion includes determining whether the reference SNRs are normal. Normal reference SNRs may correspond to low noise floors on the upstream channels during a scheduled quiescent period. As no CMs 28 are scheduled to transmit during the quiescent periods the low noise floor may indicate the absence of an external RF source into the upstream channel. Determining whether any degradation information has been logged during an all-channels-active period may indicate that the source of the impairment is a faulty CM 28. If the degradation information that has been logged during the all-channels-active periods correspond to only one particular CM 28, this may imply that the impairment strongly correlates with this uniquely identified CM 28. The correspondence may be manifested as the one particular CM 28 always being present in each of the all-channels-active logged degradation information. Additionally, the same CM 28 would provide degradation information during single-channel-active periods when the CM 28 is transmitting, and determining whether there is corresponding logged information would strengthen the conclusion that the source of impairment is a faulty CM 28.

In yet another exemplary preferred embodiment, the Step 204 of identifying the source of RF impairment includes concluding that the source is a device on the upstream path that carries the transmissions on the upstream channel. The upstream path device may be an O/E node 24 or a cable network amplifier 42 in the data-over-cable system, although many other types of upstream path devices are possible and the present invention is not limited to O/E nodes or cable network amplifiers. Reaching the conclusion includes determining whether the reference SNRs are normal. As above, normal reference SNRs may correspond to a low noise floor during a scheduled quiescent period. The data-over-cable system is displaying no aberrant behavior when no CMs 28 are transmitting. Determining whether any degradation information has been logged may indicate that the source of the impairment is a faulty upstream path device. If the degradation information that has been logged correspond to a cluster of CMs 28, and this cluster has a particular upstream path device in common, this may imply that the impairment strongly correlates with this uniquely identified upstream path device. Additionally, the same cluster of CMs 28 would provide degradation information during single-channel-active periods when any of the CMs 28 in the cluster are transmitting, and determining whether there is corresponding logged information would strengthen the conclusion that the source of impairment is a device on the upstream path that the cluster has in common.

Additionally, the identification of the source of RF impairment at Step 204 may be accompanied by an alarm that alerts a user of the presence of the impairment. It should be understood, however, that the present invention is not limited to these embodiments and other methods for identifying the source of RF impairment on multiple upstream channels may be possible.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. In a data-over-cable system, a method for determining a source of radio frequency impairment on an upstream path, the upstream path comprising an upstream channel, the upstream channel carrying data transmissions from a plurality of cable modems to a cable modem termination system, the method comprising the steps of:
   ascertaining a reference signal-to-noise ratio;
   measuring a plurality of signal-to-noise ratios during a plurality of active periods, wherein only one cable modem transmits during each active period;
   comparing each measured signal-to-noise ratio to the reference signal-to-noise ratio to obtain a degradation value for the active period;
   determining whether the degradation value is greater than a threshold, and if so,
      logging parameters associated with the cable modem that is active during the active period;
   correlating the logged parameters; and
   identifying the source of radio frequency impairment;
   wherein the step of identifying the source of radio frequency impairment comprises the steps of:
      determining whether the reference signal-to-noise ratio is low, and if so,
      determining whether parameters for the cable modems have been logged, and if not,
      concluding that the source of radio frequency impairment is a radio frequency source that is external to the data-over-cable system, wherein the external radio frequency source interferes with the data transmission on the upstream channel.

2. In a data-over-cable system, a method for determining a source of radio frequency impairment on an upstream path, the upstream path comprising a plurality of upstream channels, each upstream channel carrying data transmissions from one of a plurality of cable modems to a cable modem termination system, the method comprising the steps of:
   ascertaining a plurality of reference signal-to-noise ratios wherein each reference signal-to-noise ratio corresponds to an upstream channel;
   scheduling a plurality of all-channels-active periods wherein all upstream channels are simultaneously active during each all-channels-active period and only one cable modem is transmitting on each of the active upstream channels;
   logging degradation information for the all-channels-active periods;
   scheduling a plurality of single-channel-active periods wherein only one upstream channel is active during each single-channel-active period and only one cable modem is transmitting on the active upstream channel;
   logging degradation information for the single-channel-active periods;
   correlating the logged degradation information for the single-channel-active periods; and
   identifying the source of radio frequency impairment;
   wherein the step of logging degradation information for the single-channel-active periods further comprises the step of:
      alerting a user that the degradation information has been logged.

3. In a data-over-cable system, a method for determining a source of radio frequency impairment on an upstream path, the upstream path comprising a plurality of upstream channels, each upstream channel carrying data transmissions from one of a plurality of cable modems to a cable modem termination system, the method comprising the steps of:
   ascertaining a plurality of reference signal-to-noise ratios wherein each reference signal-to-noise ratio corresponds to an upstream channel;
   scheduling a plurality of all-channels-active periods wherein all upstream channels are simultaneously active during each all-channels-active period and only one cable modem is transmitting on each of the active upstream channels;
   logging degradation information for-the all-channels-active periods;
   scheduling a plurality of single-channel-active periods wherein only one upstream channel is active during each single-channel-active period and only one cable modem is transmitting on the active upstream channel;
   logging degradation information for the single-channel-active periods;
   correlating the logged degradation information for the single-channel-active periods; and
   identifying the source of radio frequency impairment;
   wherein the step of logging degradation information for the single-channel-active periods comprises, for each single-channel-active period:
   measuring a signal-to-noise-ratio for the active upstream channel during the single-channel-active period;
   measuring a plurality of noise floor values during the single-channel-active period, wherein each noise floor value corresponds to an inactive upstream channel in a plurality of inactive upstream channels, and wherein each inactive upstream channel is other than the active upstream channel;
   comparing the measured signal-to-noise ratio to the reference signal-to-noise ratio that corresponds to the active upstream channel to obtain a degradation value for the active upstream channel;
   determining whether the degradation value for the active upstream channel is greater than a threshold, and if so,
   logging parameters associated with the cable modem that is transmitting on the active upstream channel;
   comparing the measured noise floor value for the each inactive upstream channel to a corresponding reference noise floor value to obtain a degradation value for the each inactive upstream channel, wherein the reference noise floor value is associated with the reference signal-to-noise value for the inactive upstream channel; and
   determining whether the degradation values for at least one inactive upstream channels are greater than the threshold, and if so,
      logging the parameters associated with the cable modem that is transmitting on the active upstream channel, and
      logging parameters associated with the inactive upstream channels.

4. The method of claim 3 wherein the threshold is defined by a user.

5. The method of claim 3 wherein each noise floor values is measured at the bandwidth of the corresponding upstream channel.

6. The method of claim 3 wherein the logged parameters that are associated with the cable modem are the measured signal-to-noise ratio and an identification value for the cable modem.

7. The method of claim 6 wherein the identification value for the cable modem is a Media Access Control address.

8. The method of claim 6 wherein the identification value for the cable modem is an Internet Protocol address.

9. The method of claim 6 wherein the identification value for the cable modem is a Service Identifier.

10. The method of claim 3 wherein the logged parameters that are associated with the inactive upstream channels are the measured noise floor values.

11. In a data-over-cable system, a method for determining a source of radio frequency impairment on an upstream path, the upstream path comprising a plurality of upstream channels, each upstream channel carrying data transmissions from one of a plurality of cable modems to a cable modem termination system, the method comprising, the steps of:

ascertaining a plurality of reference signal-to-noise ratios wherein each reference signal-to-noise ratio corresponds to an upstream channel;

scheduling a plurality of all-channels-active periods wherein all upstream channels are simultaneously active during each all-channels-active period and only one cable modem is transmitting on each of the active upstream channels;

logging degradation information for the all-channels-active periods;

scheduling a plurality of single-channel-active periods wherein only one upstream channel is active during each single-channel-active period and only one cable modem is transmitting on the active upstream channel;

logging degradation information for the single-channel-active periods, correlating the logged degradation information for the single-channel-active periods; and identifying the source of radio frequency impairment, wherein the step of identifying the source of radio frequency impairment comprises the steps of:

determining whether a selection of the upstream channels have low reference signal-to-noise ratios, and if so, determining whether the degradation information for the single-channel-active periods indicates no degradation for the selection, and if so, determining whether the degradation information for the all-channels-active periods indicates no degradation on all upstream channels, and if so, concluding that the source of radio frequency impairment is a radio frequency source that is external to the data-over-cable system, wherein the external radio frequency source interferes with the data transmission on the upstream channels.

\* \* \* \* \*